(12) United States Patent
Guo et al.

(10) Patent No.: US 10,212,429 B2
(45) Date of Patent: Feb. 19, 2019

(54) HIGH DYNAMIC RANGE VIDEO CAPTURE WITH BACKWARD-COMPATIBLE DISTRIBUTION

(71) Applicant: Apple Inc., Cupertino, CA (US)

(72) Inventors: Haitao Guo, Cupertino, CA (US); Hao Pan, Sunnyvale, CA (US); Guy Cote, San Jose, CA (US); Andrew Bai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 135 days.

(21) Appl. No.: 14/631,401

(22) Filed: Feb. 25, 2015

(65) Prior Publication Data

US 2015/0245044 A1 Aug. 27, 2015

Related U.S. Application Data

(60) Provisional application No. 61/944,484, filed on Feb. 25, 2014, provisional application No. 61/946,638, (Continued)

(51) Int. Cl.
*H04N 11/02* (2006.01)
*H04N 19/14* (2014.01)
(Continued)

(52) U.S. Cl.
CPC ........... *H04N 19/14* (2014.11); *G06F 3/1454* (2013.01); *G06T 5/009* (2013.01); *G09G 3/2007* (2013.01);
(Continued)

(58) Field of Classification Search
CPC .................................................... H04N 19/14
(Continued)

(56) References Cited

U.S. PATENT DOCUMENTS 6,762,741 B2 7/2004 Weindorf
7,508,981 B2* 3/2009 Park .................. G06F 13/40
382/166

(Continued)

FOREIGN PATENT DOCUMENTS

CN 103262535 8/2013
EP 1827024 2/2007

(Continued)

OTHER PUBLICATIONS

International Search Report and Written Opinion from PCT/US2015/017536, dated Jul. 28, 2015, Apple Inc., pp. 1-18.
(Continued)

*Primary Examiner* — Leron Beck
(74) *Attorney, Agent, or Firm* — Robert C. Kowert; Meyertons, Hood, Kivlin, Kowert & Goetzel, P.C.

(57) ABSTRACT

Video processing techniques and pipelines that support capture, distribution, and display of high dynamic range (HDR) image data to both HDR-enabled display devices and display devices that do not support HDR imaging. A sensor pipeline may generate standard dynamic range (SDR) data from HDR data captured by a sensor using tone mapping, for example local tone mapping. Information used to generate the SDR data may be provided to a display pipeline as metadata with the generated SDR data. If a target display does not support HDR imaging, the SDR data may be directly rendered by the display pipeline. If the target display does support HDR imaging, then an inverse mapping technique may be applied to the SDR data according to the metadata to render HDR data for display. Information used in performing color gamut mapping may also be provided in the metadata and used to recover clipped colors for display.

19 Claims, 14 Drawing Sheets

Related U.S. Application Data filed on Feb. 28, 2014, provisional application No. 61/946,633, filed on Feb. 28, 2014.

(51) Int. Cl.

| | |
|---|---|
| *G06T 5/00* | (2006.01) |
| *G09G 3/20* | (2006.01) |
| *G09G 5/00* | (2006.01) |
| *H04N 1/60* | (2006.01) |
| *H04N 5/50* | (2006.01) |
| *H04N 9/64* | (2006.01) |
| *H04N 9/67* | (2006.01) |
| *H04N 19/136* | (2014.01) |
| *H04N 19/184* | (2014.01) |
| *H04N 19/186* | (2014.01) |
| *H04N 19/169* | (2014.01) |
| *H04N 19/44* | (2014.01) |
| *H04N 19/30* | (2014.01) |
| *H04N 19/33* | (2014.01) |
| *H04N 19/176* | (2014.01) |
| *H04N 19/182* | (2014.01) |
| *H04N 19/52* | (2014.01) |
| *G06F 3/14* | (2006.01) |
| *G09G 5/02* | (2006.01) |
| *G09G 5/10* | (2006.01) |
| *H04N 1/64* | (2006.01) |
| *H04N 5/20* | (2006.01) |
| *H04N 5/235* | (2006.01) |
| *H04N 19/172* | (2014.01) |
| *H04N 19/102* | (2014.01) |
| *H04N 19/137* | (2014.01) |
| *H04N 19/177* | (2014.01) |
| *H04N 21/422* | (2011.01) |
| *H04N 21/431* | (2011.01) |
| *H04N 19/124* | (2014.01) |
| *H04N 19/154* | (2014.01) |
| *H04N 19/17* | (2014.01) |
| *H04N 19/98* | (2014.01) |
| *H04N 19/86* | (2014.01) |
| *H04N 19/463* | (2014.01) |
| *H04N 21/4223* | (2011.01) |
| *H04N 21/44* | (2011.01) |
| *H04N 21/4402* | (2011.01) |
| *H04N 21/442* | (2011.01) |
| *H04N 21/485* | (2011.01) |

(52) U.S. Cl.
CPC .............. *G09G 5/005* (2013.01); *G09G 5/02* (2013.01); *G09G 5/10* (2013.01); *H04N 1/6066* (2013.01); *H04N 1/64* (2013.01); *H04N 5/20* (2013.01); *H04N 5/2355* (2013.01); *H04N 5/505* (2013.01); *H04N 9/641* (2013.01); *H04N 9/67* (2013.01); *H04N 19/102* (2014.11); *H04N 19/124* (2014.11); *H04N 19/136* (2014.11); *H04N 19/137* (2014.11); *H04N 19/154* (2014.11); *H04N 19/17* (2014.11); *H04N 19/172* (2014.11); *H04N 19/176* (2014.11); *H04N 19/177* (2014.11); *H04N 19/182* (2014.11); *H04N 19/184* (2014.11); *H04N 19/186* (2014.11); *H04N 19/188* (2014.11); *H04N 19/30* (2014.11); *H04N 19/33* (2014.11); *H04N 19/44* (2014.11); *H04N 19/52* (2014.11); *H04N 19/98* (2014.11); *H04N 21/42202* (2013.01); *H04N 21/4318* (2013.01); *G06T 2207/20208* (2013.01); *G09G 2320/0261* (2013.01); *G09G 2320/0271* (2013.01); *G09G 2320/062* (2013.01); *G09G 2320/066* (2013.01); *G09G 2320/0613* (2013.01); *G09G 2320/0626* (2013.01); *G09G 2320/0666* (2013.01); *G09G 2320/0673* (2013.01); *G09G 2320/0686* (2013.01); *G09G 2320/0693* (2013.01); *G09G 2320/08* (2013.01); *G09G 2320/103* (2013.01); *G09G 2340/02* (2013.01); *G09G 2360/144* (2013.01); *G09G 2370/042* (2013.01); *H04N 19/463* (2014.11); *H04N 19/86* (2014.11); *H04N 21/4223* (2013.01); *H04N 21/4402* (2013.01); *H04N 21/44008* (2013.01); *H04N 21/44218* (2013.01); *H04N 21/4854* (2013.01)

(58) Field of Classification Search
USPC ........................................ 375/240.01–240.29
See application file for complete search history.

(56) References Cited

U.S. PATENT DOCUMENTS

| | | | |
|---|---|---|---|
| 7,593,024 B2 | 9/2009 | Andrews et al. | |
| 8,014,445 B2 | 9/2011 | Segall et al. | |
| 8,212,764 B2 | 7/2012 | Song et al. | |
| 8,248,486 B1 | 8/2012 | Ward et al. | |
| 8,483,479 B2 | 7/2013 | Kunkel et al. | |
| 8,625,844 B2 | 1/2014 | Chen | |
| 8,866,975 B1* | 10/2014 | Chen | H04N 19/44 345/590 |
| 8,897,377 B2 | 11/2014 | Dougherty, III et al. | |
| 9,076,224 B1* | 7/2015 | Shah | G06T 5/009 |
| 2002/0164048 A1 | 11/2002 | Bruckstein et al. | |
| 2002/0196470 A1* | 12/2002 | Kawamoto | G06T 3/4023 358/3.06 |
| 2003/0086595 A1 | 5/2003 | Bruckstein et al. | |
| 2005/0117799 A1 | 6/2005 | Fuh et al. | |
| 2007/0104378 A1* | 5/2007 | Aguera Y Arcas | G06K 9/00476 382/232 |
| 2008/0137990 A1* | 6/2008 | Ward | H04N 19/30 382/299 |
| 2008/0316372 A1 | 12/2008 | Xu et al. | |
| 2009/0027558 A1* | 1/2009 | Mantiuk | H04N 1/6027 348/673 |
| 2010/0157078 A1* | 6/2010 | Atanassov | G06T 5/007 348/222.1 |
| 2010/0172411 A1* | 7/2010 | Efremov | H04N 19/136 375/240.12 |
| 2011/0194618 A1 | 8/2011 | Gish et al. | |
| 2011/0243473 A1* | 10/2011 | Chen | G06T 5/007 382/274 |
| 2011/0292992 A1* | 12/2011 | Sirivara | H04N 21/23418 375/240.01 |
| 2012/0007965 A1 | 1/2012 | Mihara et al. | |
| 2012/0105681 A1 | 5/2012 | Morales | |
| 2012/0314944 A1* | 12/2012 | Ninan | H04N 19/647 382/166 |
| 2013/0003086 A1* | 1/2013 | Mebane | H04N 1/6058 358/1.9 |
| 2013/0044122 A1 | 2/2013 | Ho et al. | |
| 2013/0076763 A1* | 3/2013 | Messmer | H04N 1/6058 345/506 |
| 2013/0076974 A1* | 3/2013 | Atkins | H04N 5/235 348/362 |
| 2013/0308027 A1* | 11/2013 | Jenkin | H04N 5/347 348/302 |
| 2013/0321671 A1* | 12/2013 | Cote | H04N 5/365 348/241 |
| 2013/0328842 A1 | 12/2013 | Barnhoefer et al. | |
| 2014/0022460 A1* | 1/2014 | Li | G06T 5/009 348/708 |
| 2014/0198137 A1 | 7/2014 | Feng et al. | |

(56) References Cited

U.S. PATENT DOCUMENTS

| | | | |
|---|---|---|---|
| 2014/0241418 A1* | 8/2014 | Garbas | H04N 19/00042 375/240.02 |
| 2014/0267822 A1* | 9/2014 | Roffet | H04N 5/225 348/222.1 |
| 2014/0321561 A1 | 10/2014 | Stec et al. | |
| 2014/0340434 A1 | 11/2014 | El-Ghoroury et al. | |
| 2014/0341272 A1 | 11/2014 | Miller et al. | |
| 2015/0016735 A1 | 1/2015 | Kikuchi | |
| 2016/0156965 A1* | 6/2016 | Oh | H04N 19/46 725/116 |

FOREIGN PATENT DOCUMENTS

| | | |
|---|---|---|
| EP | 1827024 | 8/2007 |
| JP | 2002-542739 | 12/2002 |
| JP | 2013-545371 | 12/2013 |
| KR | 10-2013-0084670 | 7/2013 |
| WO | 2007026283 | 3/2007 |
| WO | 2012122425 | 9/2012 |
| WO | 2012166382 | 12/2012 |
| WO | 2012177575 | 12/2012 |
| WO | 2014135901 | 9/2014 |
| WO | 2015007505 | 1/2015 |

OTHER PUBLICATIONS

Bordes Philippe, et al, "Color Gamut Scalable Video Coding for SHVC," 2013 Picture Coding Symposium (PCS), IEEE, Dec. 8, 2013, pp. 301-304.
Sebastien Lasserre, et al., "High Dynamic Range Video Coding," Joint Collaborative Team on Video Coding (JCT-VC), 16th Meeting, Jan. 9-17, 2014, pp. 1-8.
Partial International Search Report from PCT/US2015/017536, dated May 21, 2015, Apple Inc., pp. 1-8.
Bordes Philippe, et al., "Color Gamut Scalable Video Coding for SHVC", 2013 Picture Coding Symposium (PCS), IEEE, Dec. 8, 2013 (Dec. 8, 2013), pp. 301-304.
International Search Report and Written Opinion from PCT/US2015/ 017539, dated May 20, 2015, Apple Inc., pp. 1-4.
International Written Opinion from PCT/US2015/017539, dated Feb. 25, 2015, Apple Inc., pp. 1-6.
International Search Report and Written Opinion from PCT/US2015/ 017540, dated May 15, 2015, Apple Inc., pp. 1-6.
Herbert Thoma: "The adaptive LogLUV transfrom for mapping HOR video to traditional video codecs", 106. MPEG Meeting; Oct. 28, 2013-Nov. 1, 2013; Geneva; (Motion Picture Expert Group or ISO/IEC JTC1/SC29/WG11 ), No. M31308, Oct. 23, 2013, XP030059761, pp. 1-6.
Jens-Uwe Garbas et al: "Temporally coherent luminance-to-luma mapping for high dynamic range video coding with H.264/AVC", IEEE International Conference on Acoustics, Speech and Signal Processing, May 22, 2011, pp. 829-832.
Lauga Paul et al: "Segmentation-based optimized tone mapping for high dynamic range image and video coding", Picture Coding Symposium, Dec. 8, 2013, pp. 257-260.
Lasserre S et al: "High Dynamic Range video coding", 16. JCT-VG Meeting; Jan. 9, 2014-Jan. 17, 2014; San Jose; (Joint Collaborative Team on Video Coding of ISO/IEC JTC1/SC29/WG11 and ITU-T SG. 16 ); URL: http://wftp3.itu.int/av-arch/jctvc-site/, No. JCTVC-P0159, Jan. 5, 2014, pp. 1-9.
Fogg (Harmonic) C et al: "Indication of SMPTE 2084, 2085 and carriage of 2086 metadata in HEVC", 16. JCT-VC Meeting, Jan. 9, 2014-Jan. 17, 2014, http://wftp3.itu.int/av-arch/jctvc-site/, No. JCTVC-P0084-v2, pp. 1-5.
Segall A et al: "Tone mapping SEI Message", 19. JVT Meeting; Mar. 31, 2006-Apr. 7, 2006; Geneva, CH; (Joint Videoteam of ISO/IEC/JTC1/SC29/WG11 and ITU-T SG.16 ), No. JVT-5087, Apr. 1, 2006, pp. 1-12.
Yasir Salih et al: "Tone mapping of HDR images: A review", IEEE International Conference on Intelligent and Advanced Systems, Jun. 12, 2012, pp. 368-373.
Boyce J et al: "High level syntax hooks for future extensions", 8. JCT-VC Meeting; 99. MPEG Meeting; Jan. 2, 2012-Oct. 2, 2012; San Jose; (Joint Collaborative Team on Video Coding of ISO/IEC JTC1/SC29/WG11 and ITU-T SG.16 ); URL: http://wftp3.itu.int/av-arch/jctvc-site/, No. JCTVC-H0388, Jan. 21, 2012, pp. 1-8.
International Written Opinion from PCT/US2015/017540, dated Feb. 25, 2014, Apple, pp. 1-13.
U.S. Appl. No. 14/631,398, filed Feb. 25, 2015, Kenneth I. Greenebaum.
U.S. Appl. No. 14/631,394, filed Feb. 25, 2015, Kenneth I. Greenebaum.
U.S. Appl. No. 14/631,410, filed Feb. 25, 2015, Alexandros Tourapis.
U.S. Appl. No. 14/631,405, filed Feb. 25, 2015, Hao Pan.
Office Action from Australian Application No. 2015223123, dated Jul. 27, 2017, Apple Inc., pp. 1-7.
Ajit Motra, et al., "An Adaptive LogLuv Transform for High Dynamic Range Video Compression", Proceeding of 2010 IEEE 17th International Conference on Image Processing, Sep. 26-29, 2010, pp. 2061-2064.
Office Action from Japanese Application No. 2016/548661, dated Oct. 6, 2017, Apple Inc., pp. 1-8.
Pavel Kosenko, "How to use curves", Retrieved from URL: https://pavelkosenko.wordpress.com/2012/04/01/how-to-use-curves/, pp. 1-27.
Office Action from Chinese Application No. 201580010095.8, (English Translation, Chinese Version), Apple Inc., dated Dec. 3, 2018, pp. 1-21.
Office Action from Korean Application No. 10-2018-7025884, Apple Inc., dated Oct. 2, 2018, pp. 1-10.

* cited by examiner

HIGH DYNAMIC RANGE VIDEO CAPTURE WITH BACKWARD-COMPATIBLE DISTRIBUTION

PRIORITY INFORMATION

This application claims benefit of priority of U.S. Provisional Application Ser. No. 61/944,484 entitled "DISPLAY PROCESSING METHODS AND APPARATUS" filed Feb. 25, 2014, the content of which is incorporated by reference herein in its entirety, to U.S. Provisional Application Ser. No. 61/946,638 entitled "DISPLAY PROCESSING METHODS AND APPARATUS" filed Feb. 28, 2014, the content of which is incorporated by reference herein in its entirety, and to U.S. Provisional Application Ser. No. 61/946,633 entitled "ADAPTIVE METHODS AND APPARATUS" filed Feb. 28, 2014, the content of which is incorporated by reference herein in its entirety.

BACKGROUND

1. Technical Field

This disclosure relates generally to digital video or image processing and display.

2. Description of the Related Art

Various devices including but not limited to personal computer systems, desktop computer systems, laptop and notebook computers, tablet or pad devices, digital cameras, digital video recorders, and mobile phones or smart phones may include software and/or hardware that may implement video processing method(s). For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources according to one or more video processing methods and output the processed video frames to one or more destinations.

As an example, a video encoder may be implemented as an apparatus, or alternatively as a software program, in which digital video input is encoded or converted into another format according to a video encoding method, for example a compressed video format such as H.264/Advanced Video Coding (AVC) format, or H.265 High Efficiency Video Coding (HEVC) format. As another example, a video decoder may be implemented as an apparatus, or alternatively as a software program, in which video in a compressed video format such as AVC or HEVC is received and decoded or converted into another (decompressed) format according to a video decoding method, for example a display format used by a display device. The H.264/AVC standard is published by ITU-T in a document titled "ITU-T Recommendation H.264: Advanced video coding for generic audiovisual services". The H.265/HEVC standard is published by ITU-T in a document titled "ITU-T Recommendation H.265: High Efficiency Video Coding".

In many systems, an apparatus or software program may implement both a video encoder component and a video decoder component; such an apparatus or program is commonly referred to as a codec. Note that a codec may encode/decode both visual/image data and audio/sound data in a video stream.

Generally defined, dynamic range is the ratio between the largest and smallest possible values of a changeable quantity, such as in signals like sound and light. In digital image and video processing, conventionally, digital images (e.g., video or still images) are captured, rendered, and displayed at a limited dynamic range, referred to as standard dynamic range (SDR) imaging. In addition, images are conventionally rendered for display using a relatively narrow color gamut, referred to as standard color gamut (SCG) imaging. Extended or high dynamic range (HDR) imaging refers to technology and techniques that produce a wider range of luminance in electronic images (e.g., as displayed on display screens or devices) than is obtained using standard digital imaging technology and techniques (referred to as standard dynamic range, or SDR, imaging). Many new devices such as image sensors and displays support HDR imaging as well as wide color gamut (WCG) imaging. These devices may be referred to as HDR-enabled devices or simply HDR devices. At the same time, many video capture devices and display devices may not directly support HDR imaging and/or WCG imaging.

SUMMARY OF EMBODIMENTS

Embodiments of video processing techniques and pipelines are described that support capture, distribution, and display of high dynamic range (HDR) image data to both HDR-enabled display devices and display devices that do not support HDR imaging. In embodiments, a sensor pipeline may generate lower or standard dynamic range (SDR) image data from HDR image data captured by an image sensor, for example using a tone mapping technique. Information used to generate the SDR image data may be recorded as metadata with the generated SDR image data. The SDR image data may be provided to a display pipeline to be rendered for display on a target display device. If the target display device does not support HDR imaging, the SDR image data may be directly rendered by the display pipeline for display. If the target display does support HDR imaging, then an inverse mapping technique may be applied to the SDR image data by the display pipeline according to the metadata to render HDR image data for display.

In some embodiments, instead of or in addition to a global tone mapping (GTM) technique, a local tone mapping (LTM) technique may be used in the sensor pipeline in converting the input HDR image data to SDR image data. In an LTM technique, an image or frame is divided into multiple regions, with a tone curve dynamically determined for each region. The regional or local tone curves can be parameterized and stored in the metadata that is passed to the display pipeline so that tone or luminance can be at least partially recovered in an inverse tone mapping technique. In some embodiments, the local tone mapping metadata can be compressed spatially (e.g., within an image) and/or temporally (e.g., across two or more frames).

In some embodiments, the inverse tone mapping technique performed by the display pipeline may be tuned to match the dynamic range of the target display. In some embodiments, the inverse tone mapping technique of the display pipeline may be an ambient adaptive process in which information about ambient light or other environmental conditions for the display may be used to adjust the inverse tone mapping process, for example by modifying or weighting one or more of the tone curves used in local tone mapping.

In some embodiments, in addition to tone mapping information, information used in performing color gamut mapping on the sensor pipeline may be recorded in the metadata and used by the display pipeline in image reconstruction to recover a wider color gamut for displays that support WCG imaging. In some embodiments, the sensor pipeline may generate image data in an intermediate color gamut that a display pipeline can map to the lower display color gamut supported by a respective display according to the metadata.

Figure 1:
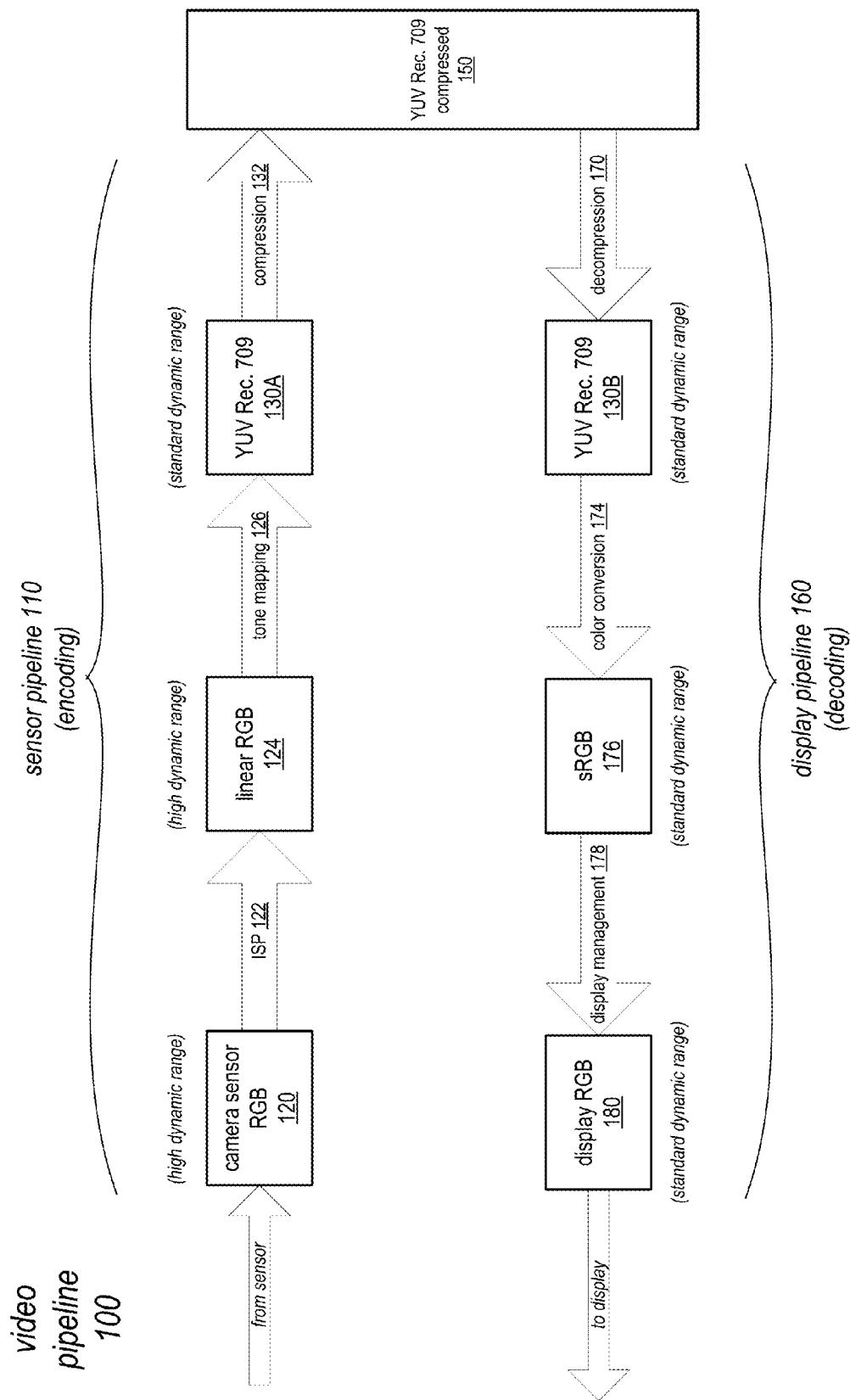
FIG. 1 illustrates operations of a video pipeline.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION

Embodiments of video processing techniques and pipelines are described that support capture, distribution, and display of high dynamic range (HDR) image data to both HDR-enabled display devices and display devices that do not support HDR imaging. Embodiments of a video processing pipeline may include a sensor pipeline portion and a display pipeline portion. The sensor pipeline and display pipeline may be in the same device, or may be in different devices. In embodiments, the sensor pipeline may generate lower or standard dynamic range (SDR) image data from HDR image data captured by an image sensor or photosensor of a camera associated with the sensor pipeline, for example using a tone mapping technique. Information used to generate the SDR image data (e.g., tone mapping information such as parameterized tone curves) may be recorded as metadata with the generated SDR image data. The SDR image data may be provided to a display pipeline to be rendered for display on a target display device. If the target display device does not support HDR imaging, the SDR image data may be directly rendered by the display pipeline for display. If the target display does support HDR imaging, then an inverse mapping technique may be applied to the SDR image data by the display pipeline according to the metadata to render HDR image data for display.

In some embodiments, a global tone mapping (GTM) technique may be used in the sensor pipeline in converting the input HDR image data to SDR image data. In a GTM technique, a global tone curve may be specified or determined for one or more video frames and used in converting the HDR image data to SDR. In some embodiments, the global tone curve can be parameterized and stored in metadata that is passed to the display pipeline so that tone or luminance can be at least partially recovered in an inverse tone mapping technique when generating the HDR image data from the input SDR image data.

In some embodiments, instead of or in addition to a GTM technique, a local tone mapping (LTM) technique may be used in the sensor pipeline in converting the input HDR image data to SDR image data. In an LTM technique, an image or frame is divided into multiple regions, with a tone curve dynamically determined for each region. The regional or local tone curves can be parameterized and stored in the metadata that is passed to the display pipeline so that tone or luminance can be at least partially recovered by an inverse tone mapping technique when generating HDR image data from the input SDR image data. In some embodiments, since the local tone curves may be similar among neighboring regions on a frame or between the same region on neighboring frames, the local tone mapping metadata can be compressed spatially (e.g., within an image) and/or temporally (e.g., across two or more frames).

In some embodiments, the inverse tone mapping technique performed by the display pipeline may be tuned to match the dynamic range of the target display. The dynamic range captured by the sensor may cover a wider range than the dynamic range supported by the display, even if the display is HDR-compatible. Thus, in some embodiments, the inverse tone mapping technique of the display pipeline may modify the tone map metadata according to the dynamic range of the display, or may otherwise modify the inverse tone mapping method applied to the lower dynamic range image data, to generate HDR image data that better matches the dynamic range of the display.

In some embodiments, the inverse tone mapping technique of the display pipeline may be an ambient adaptive process in which information about ambient light or other environmental conditions for the display may be obtained, e.g. using light, motion, or other sensors on a device, and based on that information the inverse tone mapping technique may be adjusted, for example by modifying or weighting one or more parameters of the tone curves used in local tone mapping when performing the inverse tone mapping. For example, if ambient light is bright, the inverse tone mapping technique may adjust the tone curves to generate a brighter image with more contrast.

Devices such as image sensors and displays may support wide color gamut (WCG) imaging in addition to HDR imaging. In addition to supporting HDR imaging, embodiments may also support wide color gamut (WCG) imaging. In some embodiments, the sensor pipeline may generate lower color gamut image data from wider color gamut image data captured by an image sensor of a camera associated with the sensor pipeline using a color gamut mapping technique that may clip colors from the wider color gamut range of a color space (e.g., an RGB color space) that aren't available in the lower color gamut of another color space (e.g., a YUV color space). In some embodiments, in addition to tone mapping information, information used in performing the color gamut mapping may be recorded in the metadata and used by the display pipeline in image reconstruction to recover a wider color gamut for displays that support WCG imaging. In some embodiments, the sensor pipeline may generate image data in an intermediate color gamut that a display pipeline can map to the lower display color gamut supported by a respective display according to the metadata.

Embodiments of video pipelines including sensor pipelines and display pipelines as described herein may, for example, be implemented in devices or systems that include one or more image capture devices and/or one or more display devices. An image capture device may be any device that includes an optical sensor or photosensor that is capable of capturing digital images or video. Image capture devices may include, but are not limited to, video cameras and still image cameras, as well as image capture devices that can capture both video and single images. Image capture devices may be stand-alone devices or may be cameras that are integrated into other devices including but not limited to smartphones, cellphones, PDAs, tablet or pad devices, multifunction devices, computing devices, laptop computers, notebook computers, netbook computers, desktop computers, and so on. Note that image capture devices may include small form factor cameras suitable for use in small devices such as cellphones, PDAs, and tablet devices. Displays or display devices may include display screens or panels that are integrated into other devices including but not limited to smartphones, cellphones, PDAs, tablet or pad devices, multifunction devices, computing devices, laptop computers, notebook computers, netbook computers, desktop computers, and so on. Display devices may also include video monitors, projectors, or in general any device that can display or project digital images and/or digital video. The displays or display devices may use LCD (liquid crystal display) technology, LPD (light emitting polymer display) technology, or LED (light emitting diode) technology, although other display technologies may be used.

Figure 10:
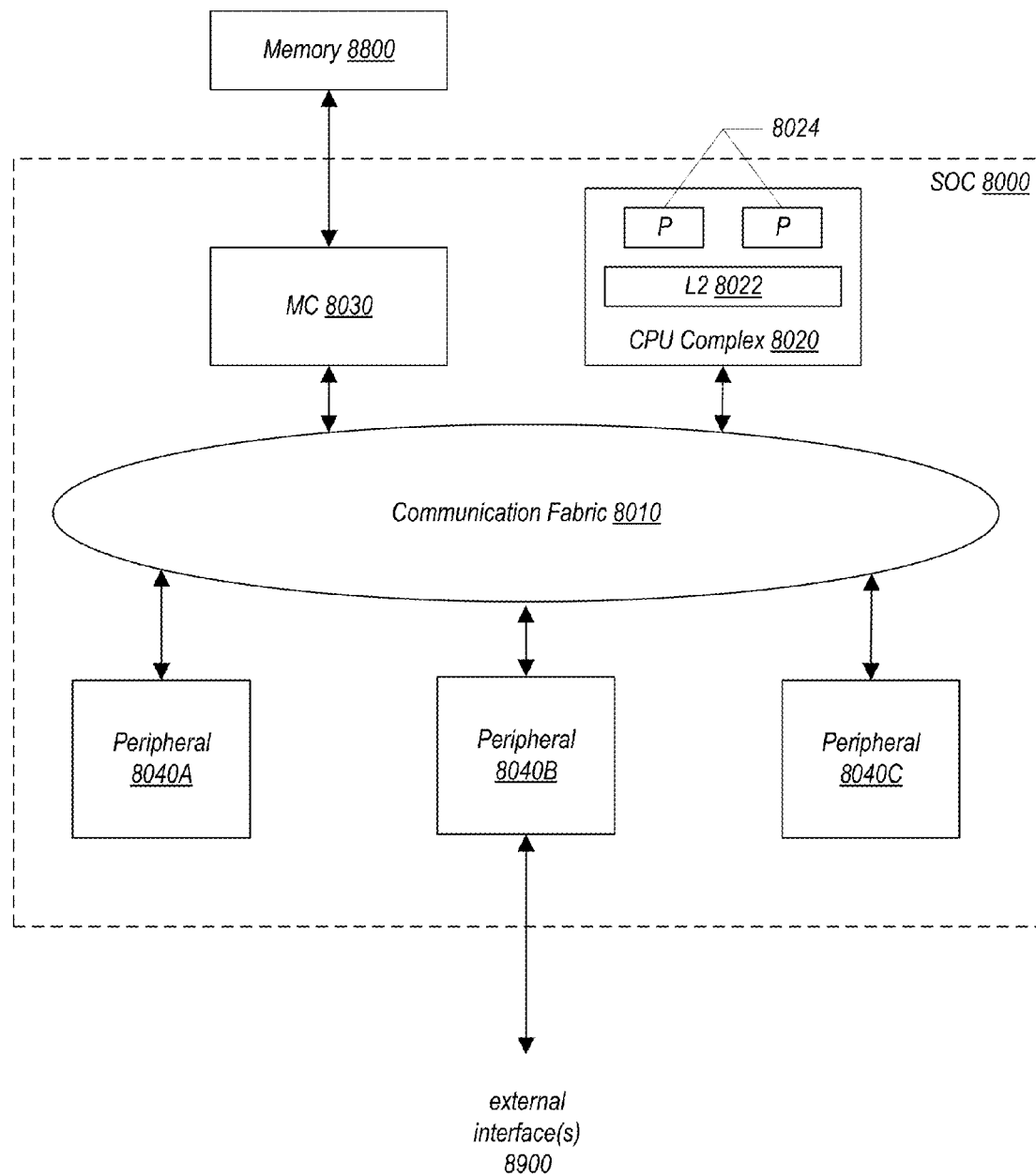
FIG. 10 is a block diagram of one embodiment of a system on a chip (SOC) that may be configured to implement aspects of the systems and methods described herein.
Figure 11:
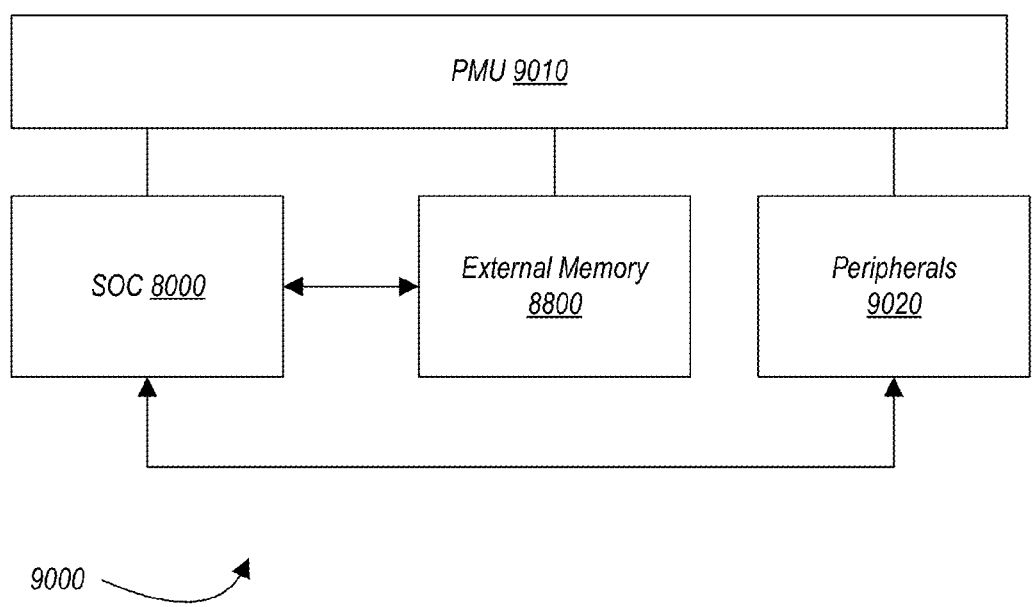
FIG. 11 is a block diagram of one embodiment of a system that may include one or more SOCs.
Figure 12:
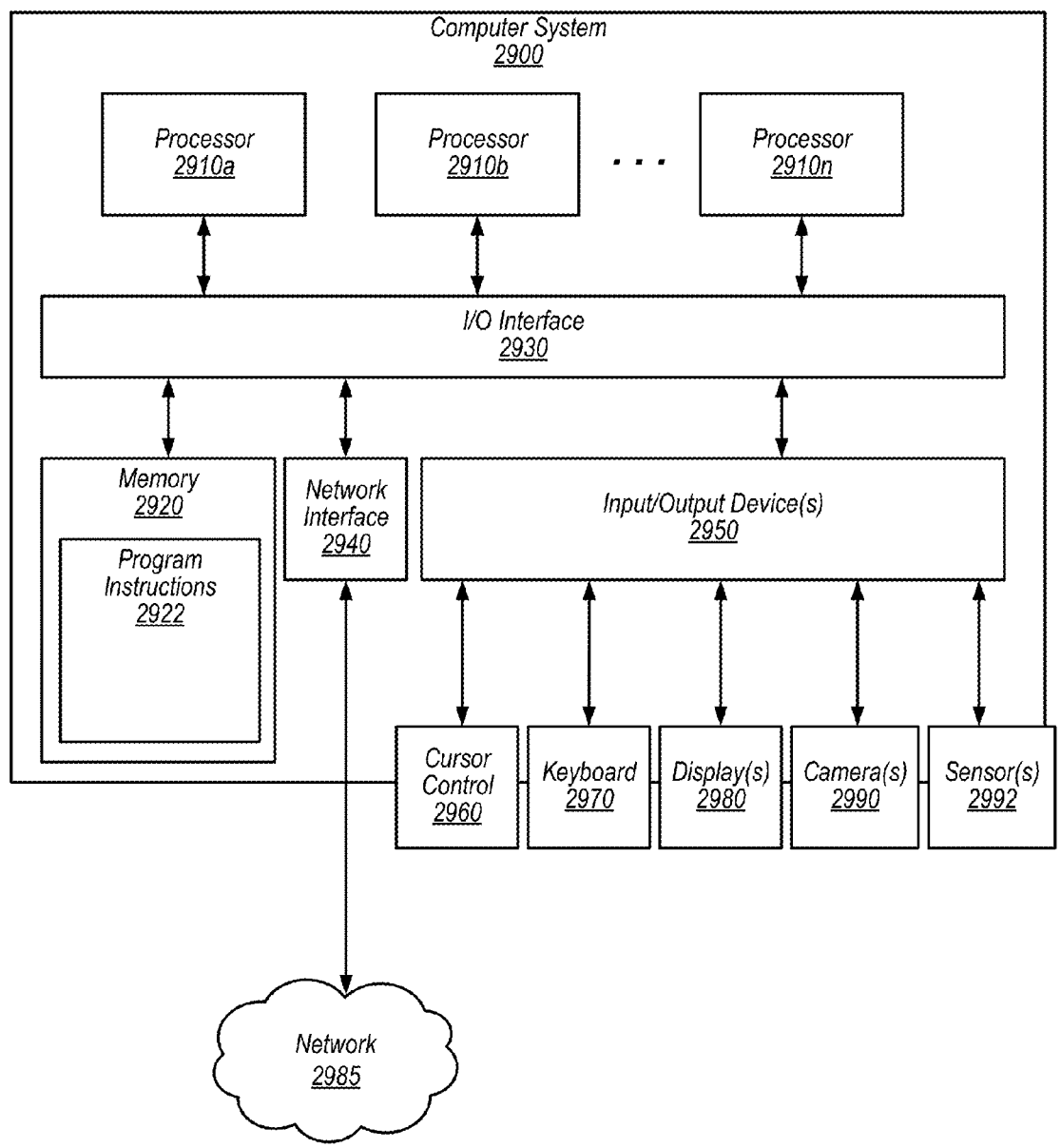
FIG. 12 illustrates an example computer system that may be configured to implement aspects of the systems and methods described herein, according to some embodiments.
Figure 13:
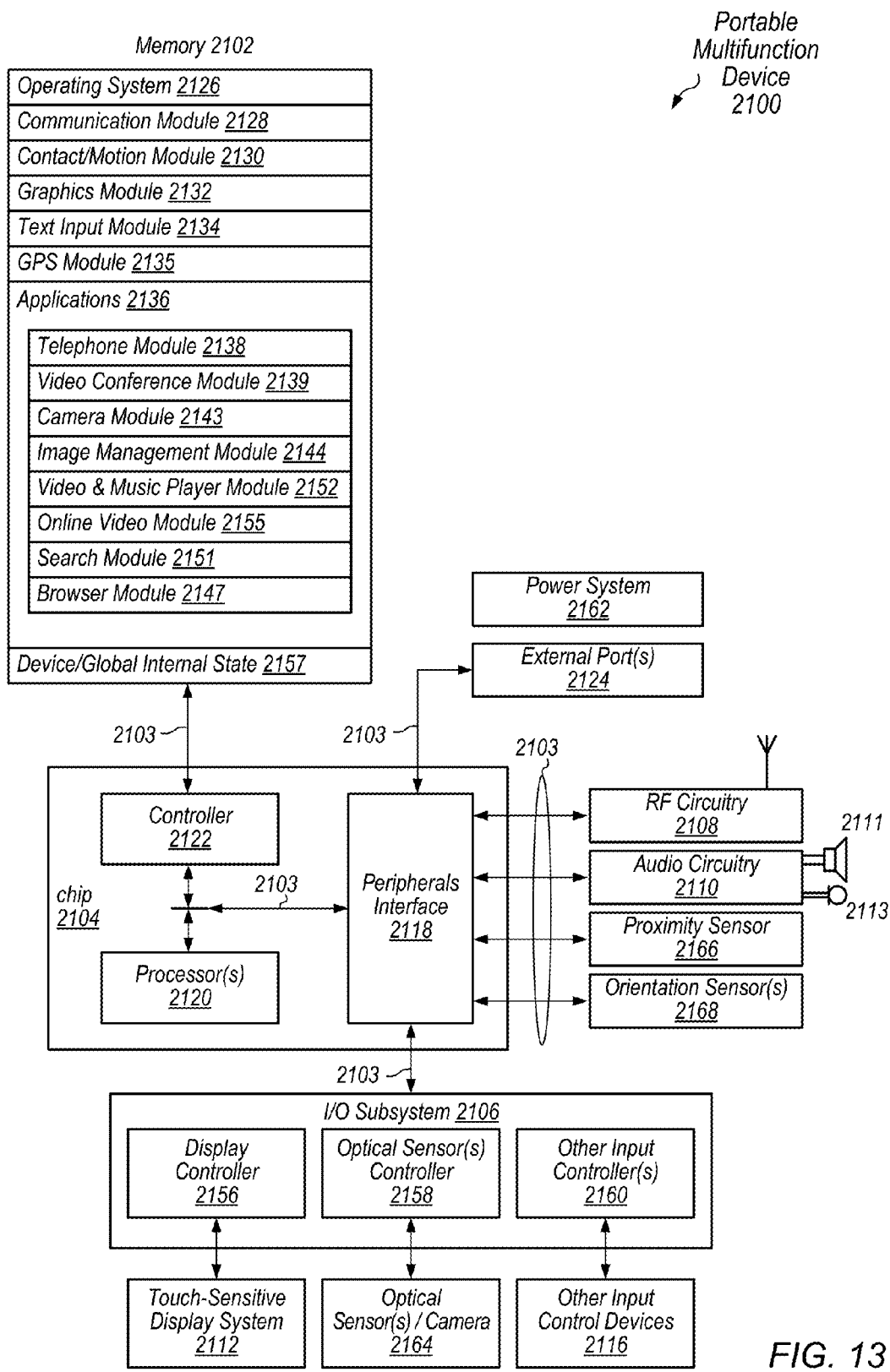
FIG. 13 illustrates a block diagram of a portable multifunction device in accordance with some embodiments.
Figure 14:
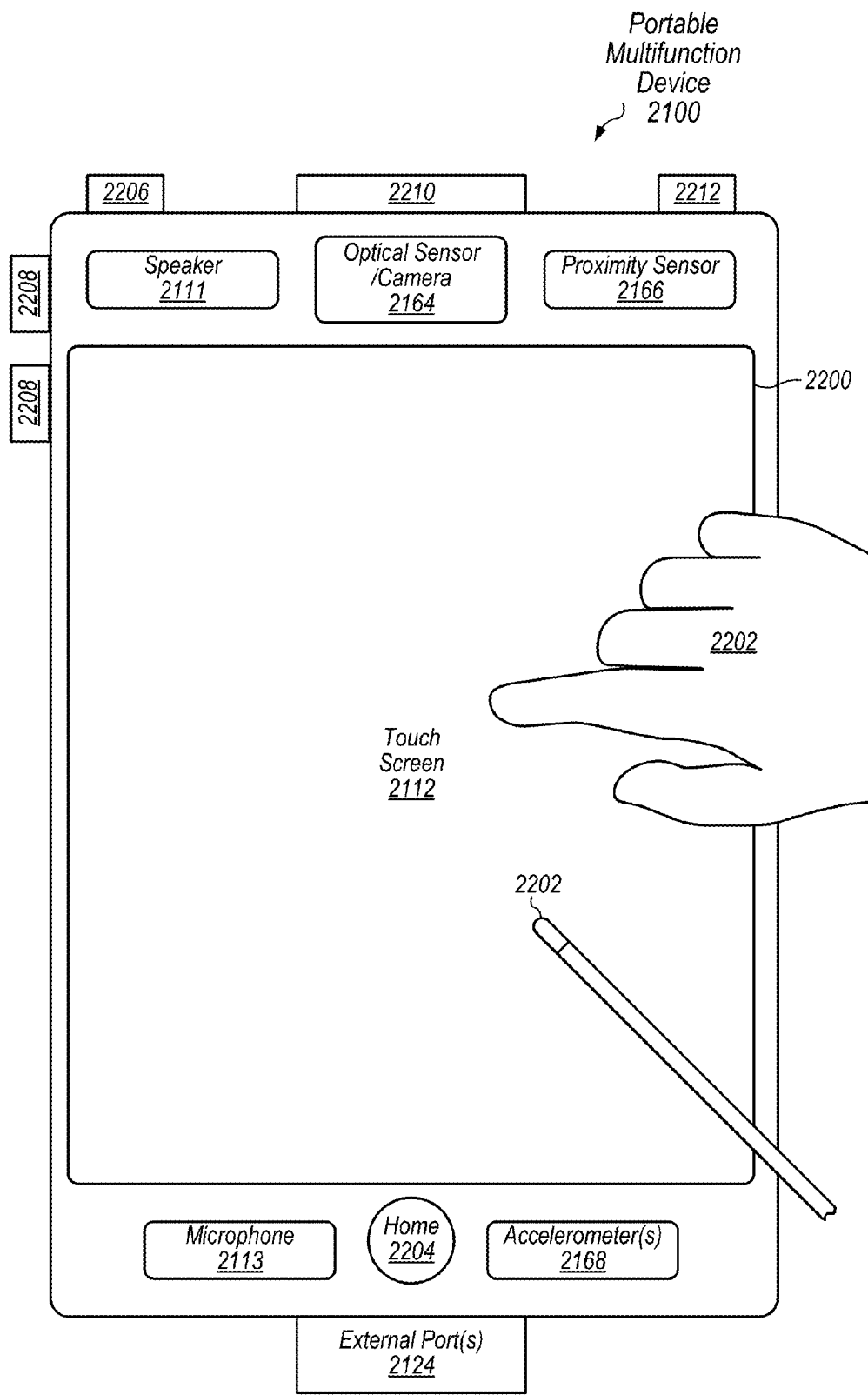
FIG. 14 depicts a portable multifunction device in accordance with some embodiments.

FIGS. 10 through 14 show non-limiting examples of devices in which embodiments may be implemented. A device or system that includes an image capture device and/or a display device may include hardware and/or software that implements at least some of the functionality for processing video data as described herein. In some embodiments, a portion of the functionality as described herein may be implemented on one device, while another portion may be implemented on another device. For example, in some embodiments, a device that includes an image capture device may implement a sensor pipeline that processes and compresses (i.e., encodes) images or video captured via a photosensor, while another device that includes a display panel or screen may implement a display pipeline that receives and processes the compressed images (i.e., decodes) for display to the panel or screen. In some embodiments, at least some of the functionality as described herein may be implemented by one or more components or modules of a system on a chip (SOC) that may be used in devices including but not limited to multifunction devices, smartphones, pad or tablet devices, and other portable computing devices such as laptop, notebook, and netbook computers. FIG. 10 illustrates an example SOC, and FIG. 11 illustrates an example device implementing an SOC. FIG. 12 illustrates an example computer system that may implement the methods and apparatus described herein. FIGS. 13 and 14 illustrate example multifunction devices that may implement the methods and apparatus described herein.

Generally defined, dynamic range is the ratio between the largest and smallest possible values of a changeable quantity, such as in signals like sound and light. In digital image processing, a high dynamic range (HDR) image is an image that is produced using an HDR imaging technique that produces a wider range of luminosity than is obtained using standard digital imaging techniques. For example, an HDR image may include more bits per channel (e.g., 10, 12, 14, or more bits per luminance (luma) and chrominance (chroma) channel), or more bits for luminosity (the luma channel), than are used in conventional image processing (typically, 8 bits per channel, e.g. 8 bits for color/chroma and for luma). An image produced using standard digital imaging techniques may be referred to as having a standard dynamic range (SDR), and typically uses 8 bits per channel. Generally defined, tone mapping is a technique that maps one set of tonal image values (e.g., from HDR image data) to another (e.g., to SDR image data). Tone mapping may be used, for example, to approximate the appearance of HDR images in a medium that has a more limited dynamic range (e.g., SDR). Tone mapping may generally be applied to luma image data.

Generally defined, color gamut refers to a particular subset of colors, for example the subset of colors which can be accurately represented in a given circumstance, such as within a given color space (e.g., an RGB color space) or by a display device. Color gamut may also refer to the complete set of colors found within an image. At least some image processing operations performed on an image may alter the image's color gamut, and in some cases some of the colors in the original image may be lost. In other words, an image's color gamut may be narrowed or clipped by an image processing technique, for example a tone mapping technique, thus reducing the number of colors that can be represented by or reproduced from the image data. In addition, a gamut mapping technique (which may also be referred to as color or chroma mapping) may be applied to image data (generally to chroma image data), and may in some cases narrow or clip an image's color gamut, or alternatively may be used to correct or adjust the color gamut or range of an image during or after tone mapping.

Embodiments are generally described as using YUV Rec. 709, otherwise known as ITU-R Recommendation BT.709, as a base SDR layer for transmitting or transferring digital image data between devices, e.g. between a camera sensor pipeline and a display pipeline. YUV Rec. 709 defines a color space and format that may be used in color image or video pipelines. However, note that other color spaces and formats may be used in embodiments. As just one example, Digital Cinema Initiatives (DCI) P3 may be used.

Embodiments are generally described as processing video frames or sequences. However, embodiments may be applied to process single or still images instead of or in addition to video frames or sequences, as well as other digital images. Thus, when "video", "video frame", "frame", or the like is used herein, it is to be understood that the terms may refer to captured digital images in general.

Backward-Compatible HDR Image Capture, Distribution, and Display Systems

FIG. 1 graphically illustrates operations of a video pipeline at a high level. As shown in FIG. 1, in a sensor pipeline 110 portion of a video pipeline 100, a camera sensor may capture images or frames, shown as camera sensor RGB data 120. The images may be captured at the sensor at a higher dynamic range (HDR image data), while a display pipeline 160 is configured to process image data at a lower dynamic range (SDR image data) for output to a display. The images may be captured by the sensor according to the RGB color model or according to other color models. An image signal processor (ISP) 122 may process the captured camera sensor RGB data 120 to generate linear RGB image data 124 as output (e.g., image data in the linear RGB color space). The linear RGB image data 124 may still be at the higher dynamic range of the sensor. A tone mapping 126 technique (e.g., a local and/or global tone mapping technique) may be applied to the linear RGB image data 124 to convert the higher dynamic range linear RGB image data 124 to YUV Rec. 709 image data 130A at a lower dynamic range (SDR) for processing by the display pipeline 160.

In some embodiments, in addition to reducing the dynamic range of the image data, application of a tone mapping 126 technique may result in the clipping of color values in the image data, thus narrowing the color gamut of the image(s). In at least some cases, a gamut mapping technique may also be applied to the image data, and may result in clipping of the color gamut of the image data.

The YUV Rec. 709 image data 130A may generally be compressed 132 to generate YUV Rec. 709 compressed data 150 for transfer or transmittal to a display pipeline 160.

As shown in FIG. 1, in a display pipeline portion 160 of a video pipeline 100, the YUV Rec. 709 compressed data 150 generated by a sensor pipeline 110 may be decompressed 170 to generate YUV Rec. 709 image data 130B at SDR. A color conversion 174 technique may then be applied to the YUV Rec. 709 image data 130B to generate sRGB image data 176, also at SDR. In other words, the image data is converted from the YUV Rec. 709 color space to the sRGB color space according to the color conversion 174 technique. The sRGB image data 176 is then passed to display management 178 hardware and/or software that renders SDR RGB image data 180 for display on a target panel or screen.

However, devices such as image sensors and displays may support high dynamic range (HDR) imaging as well as wide color gamut (WCG) imaging. These devices may be referred to as HDR-enabled devices or simply HDR devices. Using the video pipeline as shown in FIG. 1, SDR image data 150 is passed from a sensor pipeline 110 to a display pipeline 160 for a display that supports HDR or for a display that does not support HDR. SDR image data would be passed to and rendered on an HDR-enabled display according to the lower, standard dynamic range even if the sensor is capable of capturing HDR image data. In addition, the wide color gamut of the image data as original captured may be narrowed or clipped by the sensor pipeline 110 processing. Thus, much of the tonal range, color, and luminance that is actually captured by the sensor may be lost.

Embodiments of backward-compatible methods and apparatus that provide both standard dynamic range (SDR) and higher dynamic range (HDR) versions of video are described. Embodiments may implement methods and apparatus to support processing and distribution of HDR image data to both HDR-enabled display devices and devices that do not support HDR imaging. Embodiments may implement a video pipeline that includes a sensor or encoding pipeline portion and a display or decoding pipeline portion. The video pipeline may be implemented in a single device, for example a device that includes both an image capture device and a display panel. However, the sensor pipeline portion and the display pipeline portion may also be implemented in different devices, with compressed images/video transmitted from one device to the other, for example over a network, or otherwise transferred from one device to the other. For example, the sensor pipeline portion may be implemented in a video camera, and the display pipeline portion may be implemented in a display device. In some embodiments, one or both of the encoding pipeline and the display pipeline may be implemented at least in part on system on a chip (SOC).

In some embodiments, one or more encoding pipelines may be implemented on a device or system; the encoding pipeline(s) may be configured to encode input video to generate standard dynamic range (SDR) video, stream the SDR video to one or more target devices each implementing at least one decoding pipeline, and generate and provide mapping metadata used in encoding the video to the target device(s). The target devices may include both HDR-enabled devices and SDR devices that do not support HDR imaging. A decoding pipeline for an HDR-enabled device may receive and use the mapping metadata generated by the encoding pipeline to recover at least part of the HDR of the input video that was lost in the encoding process when decoding the SDR video. A decoding pipeline for a SDR device may receive and process the SDR video without applying the mapping metadata. In some embodiments, encoding pipelines and decoding pipelines may communicate information that allows an encoding pipeline to generate and transmit mapping metadata to HDR-enabled devices, while not transmitting mapping metadata to SDR devices. In some embodiments, the mapping metadata may also include information that may be used in a decoding pipeline to recover at least part of the wide color gamut (WCG) of the input video that was lost in a color gamut mapping technique that converts the WCG input video data to a narrower color gamut used in the color space of the encoded SDR video.

Figure 5:
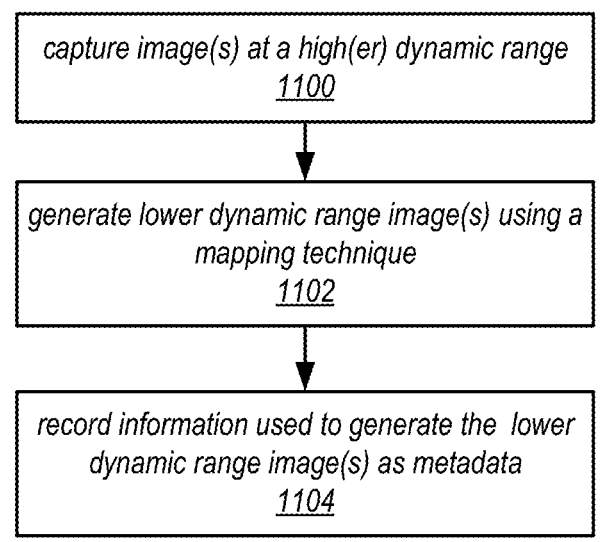
FIG. 5 is a high-level flowchart of a method that may be implemented in a sensor pipeline, according to some embodiments.

FIG. 5 is a high-level flowchart of a method that may be implemented in a sensor pipeline, according to some embodiments. As illustrated at 1100, a camera/sensor may capture image(s) at a high dynamic range. As indicated at 1102, lower dynamic range image data may be generated from the captured image data, for example using a mapping technique such as a tone mapping technique. As illustrated at 1104, information used to generate the lower dynamic range image data may be recorded as metadata with the image data. The image data and/or metadata may be compressed.

Figure 6:
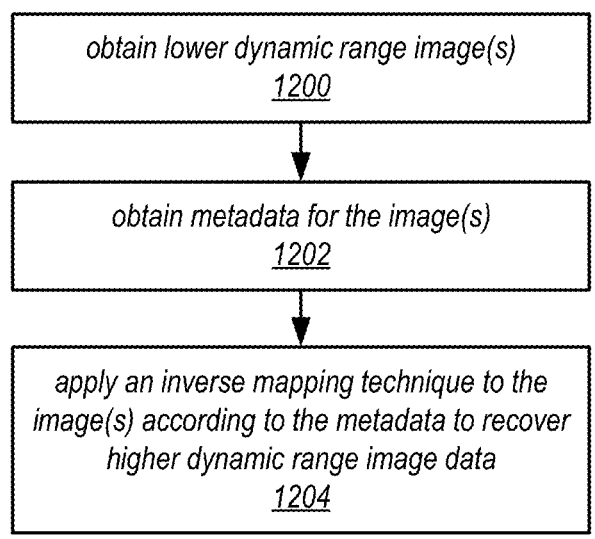
FIG. 6 is a high-level flowchart of a method that may be implemented in a display pipeline, according to some embodiments.

FIG. 6 is a high-level flowchart of a method that may be implemented in a display pipeline, according to some embodiments. As indicated at 1200, lower dynamic range image(s) may be obtained, for example from a sensor pipeline as described in FIG. 5 and illustrated in FIGS. 2 and 3. As indicated at 1202, metadata for the image(s) may also be obtained that includes information on how the image data was mapped from a higher dynamic range to a lower dynamic range. As indicated at 1204, an inverse mapping technique may be applied to the image(s) according to the metadata to recover higher dynamic range image data as captured by the sensor.

Figure 7:
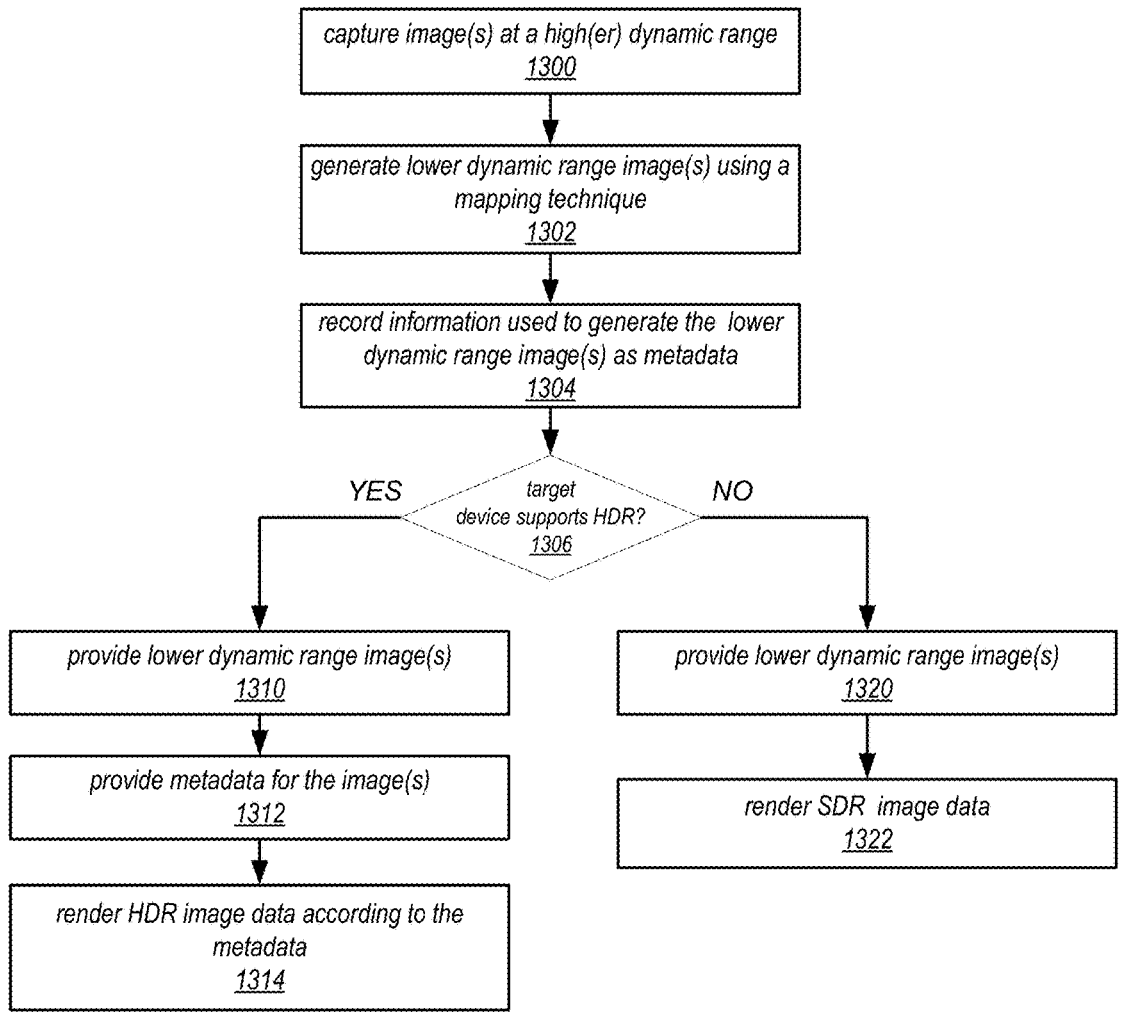
FIG. 7 is a high-level flowchart of a method that may be implemented in a video pipeline that supports HDR displays and that is backwards compatible with SDR displays, according to some embodiments.

FIG. 7 is a high-level flowchart of a method that may be implemented in a video pipeline that supports HDR displays and that is backwards compatible with SDR displays, according to some embodiments. As illustrated at 1300, a camera/sensor may capture image(s) at a high dynamic range. As indicated at 1302, lower dynamic range image data may be generated from the captured image data, for example using a mapping technique such as a tone mapping technique. As illustrated at 1304, information used to generate the lower dynamic range image data may be recorded as metadata with the image data. The image data and/or metadata may be compressed.

At 1306, the image data may be provided to a display pipeline. If the target display supports HDR imaging, then the lower dynamic range image(s) may be provided to the display pipeline, as indicated at 1310. In addition, metadata for the image(s) may also be provided that includes information on how the image data was mapped from a higher dynamic range to a lower dynamic range, as indicated at 1312. As indicated at 1314, an inverse mapping technique may be applied to the image(s) according to the metadata to render higher dynamic range image data as captured by the sensor.

At 1306, if the target display does not support HDR imaging, then the lower dynamic range image(s) may be provided to the display pipeline, as indicated at 1320. However, the metadata may not be provided. The display pipeline may then render and display SDR image data from the provided image data, as indicated at 1322. Inverse mapping to recover higher dynamic range image data is not performed, as the display does not support HDR imaging.

In some embodiments of the methods of FIGS. 5 through 7, in addition to tone mapping information, information used in performing color gamut mapping may be recorded in the metadata by the sensor pipeline and used by the display pipeline to recover a wider color gamut (WCG) for displays that support WCG imaging. In some embodiments, the sensor pipeline may generate image data in an intermediate color gamut that a display pipeline can map to a lower display color gamut supported by a respective display according to the metadata.

Elements of the methods of FIGS. 5 through 7 are further described below in reference to FIGS. 2 through 4.

Figure 2:
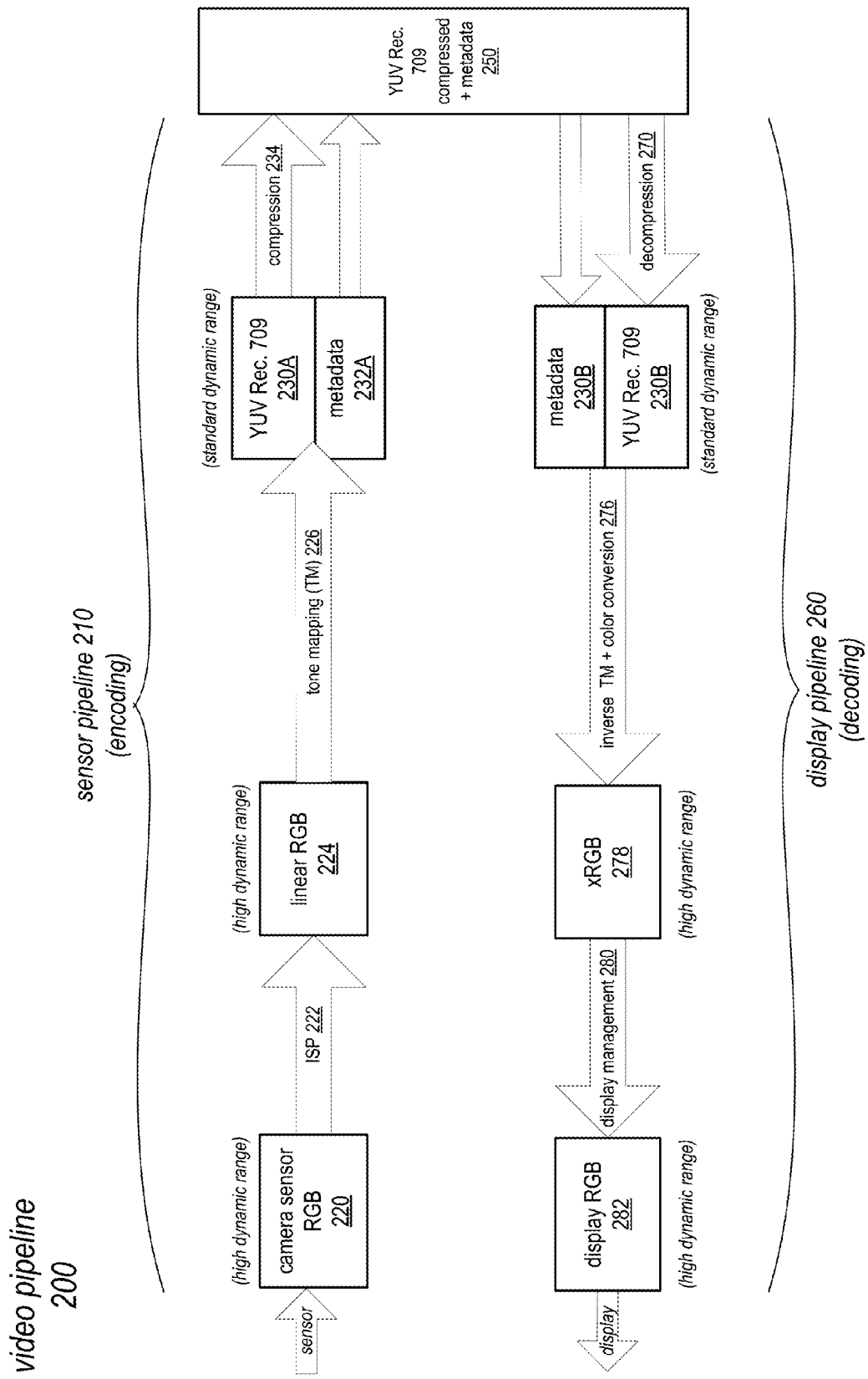
FIG. 2 illustrates an example video pipeline that may provide both standard dynamic range (SDR) and high dynamic range (HDR) video from source HDR content, according to some embodiments.

FIG. 2 illustrates an example video pipeline 200 that may process HDR image data captured by a sensor and provide both standard dynamic range (SDR) image data to non-HDR-enabled display devices and high dynamic range (HDR) image data to HDR-enabled display devices, according to some embodiments. Using the video pipeline 200 of FIG. 2, compressed SDR image data 250 may be passed from a sensor pipeline 210 to a display pipeline 260 for a display that supports HDR or for a display that does not support HDR. To support HDR-enabled display devices, metadata 232A describing the processing performed by the sensor pipeline 210 may also be passed to the display pipeline 260. The metadata 232A may allow much if not all of the tonal range, color, and/or luminance that was originally captured by the sensor but that was removed by the HDR-to-SDR conversion performed by the sensor pipeline 210 to be recovered and rendered by the display pipeline 260 and viewed on a target HDR-enabled display device. For non-HDR-enabled display devices, the SDR image data 250 can be processed as normal by the display pipeline 260, for example according to an SDR processing technique as shown for display pipeline 160 in FIG. 1.

As shown in FIG. 2, in a sensor pipeline 210 portion of a video pipeline 200, a camera sensor may capture images or frames, shown as HDR camera sensor RGB 220 data. The images may be captured by the sensor according to the RGB color model or according to other color models. An image signal processor (ISP) 222 may process the captured camera sensor RGB data 220 to generate HDR linear RGB image data 224 as output. A tone mapping module or component may apply a tone mapping 226 technique (e.g., a local (LTM) and/or global (GTM) tone mapping technique) to the linear RGB image data 224 to convert the HDR linear RGB image data 224 to SDR YUV Rec. 709 image data 230A. FIG. 4 illustrates a local tone mapping technique that may be used in some embodiments.

In some embodiments, in addition to reducing the dynamic range of the image data, application of the tone mapping 226 technique may result in the clipping of color values in the image data, thus narrowing the color gamut of the image(s). In at least some cases, a color gamut mapping technique may also be applied to the image data in the sensor pipeline 210 (e.g., by ISP 222) to map the colors from one color space (e.g., RGB) to another (e.g., YUV), which may result in clipping of the colors in the processed image data 230A.

In the video pipeline 200 shown in FIG. 2, the sensor pipeline 210 records information used to perform the tone mapping 226 and/or color gamut mapping as metadata 232A and stores, embeds, or otherwise associates the metadata with the SDR YUV Rec. 709 image data 230A. In some embodiments, the metadata 232A may be compressed temporally and/or spatially. The YUV Rec. 709 image data 230A may be compressed 234. The compressed YUV Rec. 709 image data 230A and metadata 232A may be output as compressed YUV Rec. 709+metadata 250, which may be stored, transferred or transmitted to one or more display pipelines 260.

At the display pipeline 260, the compressed YUV Rec. 709+metadata 250 may be decompressed 270 to generate metadata 232B and decompressed SDR YUV Rec. 709 image data 230B. The metadata 232B may then be used by an inverse tone mapping module or component of the display pipeline 260 in performing an inverse global and/or local tone mapping (TM) technique 276 on the SDR YUV Rec. 709 image data 230B to generate HDR image data 278. The inverse tone mapping technique 276 recovers or reconstructs at least a portion of the tonal range and luminance that was lost by the tone mapping technique 226 applied in the sensor pipeline 210.

In some embodiments, a color conversion technique may also be applied to the YUV data to convert to a different color space, for example to an xRGB (extended RGB) color space. In some embodiments, the metadata 232B may also include information used to perform color gamut mapping, and this information may be used to recover or reconstruct a portion or all of the color gamut range that was clipped in the color gamut mapping operation on the sensor pipeline 210, thus providing a wider color gamut for the HDR image data 278 for display. The xRGB image data 278 may then be passed to display management 280 hardware and/or software of an HDR-enabled device that renders HDR RGB image data 282 for display on a target panel or screen.

Using the sensor pipeline 210 as shown in FIG. 2, SDR, YUV Rec. 709 image data 230 may still be passed to display pipelines for displays that do not support HDR, and the SDR, YUV Rec. 709 image data 230B may be decompressed and processed without performing the inverse tone mapping operation (e.g., as illustrated for display pipeline 160 in FIG. 1) so that the image data can be displayed as normal SDR data on non-SDR-enabled displays. Thus, the sensor pipeline 210 as illustrated in FIG. 2 works to provide HDR imaging for HDR-enabled displays, while also being backwards compatible with displays that do not support HDR imaging.

In some embodiments, handshaking may be used between the sensor pipeline 210 and the display pipeline 260, or between the display pipeline 260 and another source of SDR, YUV Rec. 709 image data 250, so that a target display's dynamic range can be determined. If the target display does not support HDR, the compressed metadata 232A may not be transferred or transmitted to the display pipeline 260 with the compressed YUV Rec. 709 image data 230A.

In some embodiments, in the video pipeline as shown in FIG. 2, the sensor pipeline 210 and the display pipeline 260 may be components of a same device or of a same system on a chip (SOC), and the compressed SDR, YUV Rec. 709 image data 250 may be transferred, for example, over a communications bus or other connection local to the device. In some embodiments, the sensor pipeline 210 and the display pipeline 260 may instead be components of different devices, and the compressed SDR, YUV Rec. 709 image data 250 may be transferred or transmitted via other media, for example via a wired and/or wireless network, or over a connect (e.g., a USB connection) coupling the devices, or via a removable storage medium such as a thumb drive, CD, or DVD.

Local Tone Mapping

In some embodiments, a local tone mapping (LTM) technique may be used in the sensor pipeline 210 in which an image is divided into multiple regions, with each region having its own tone curve. The regional tone curves can be parameterized and stored in the metadata 232A that is passed to the display pipeline 260 so that tone/luminance can be recovered in an inverse LTM technique 276 when generating the HDR image data 278 from the input SDR image data 230B and the local tone mapping information indicated in the metadata 232B. In various embodiments, a LTM technique can be performed in RGB color space or in YUV color space; more generally, LTM as described herein may be performed in any color space.

Figure 3:
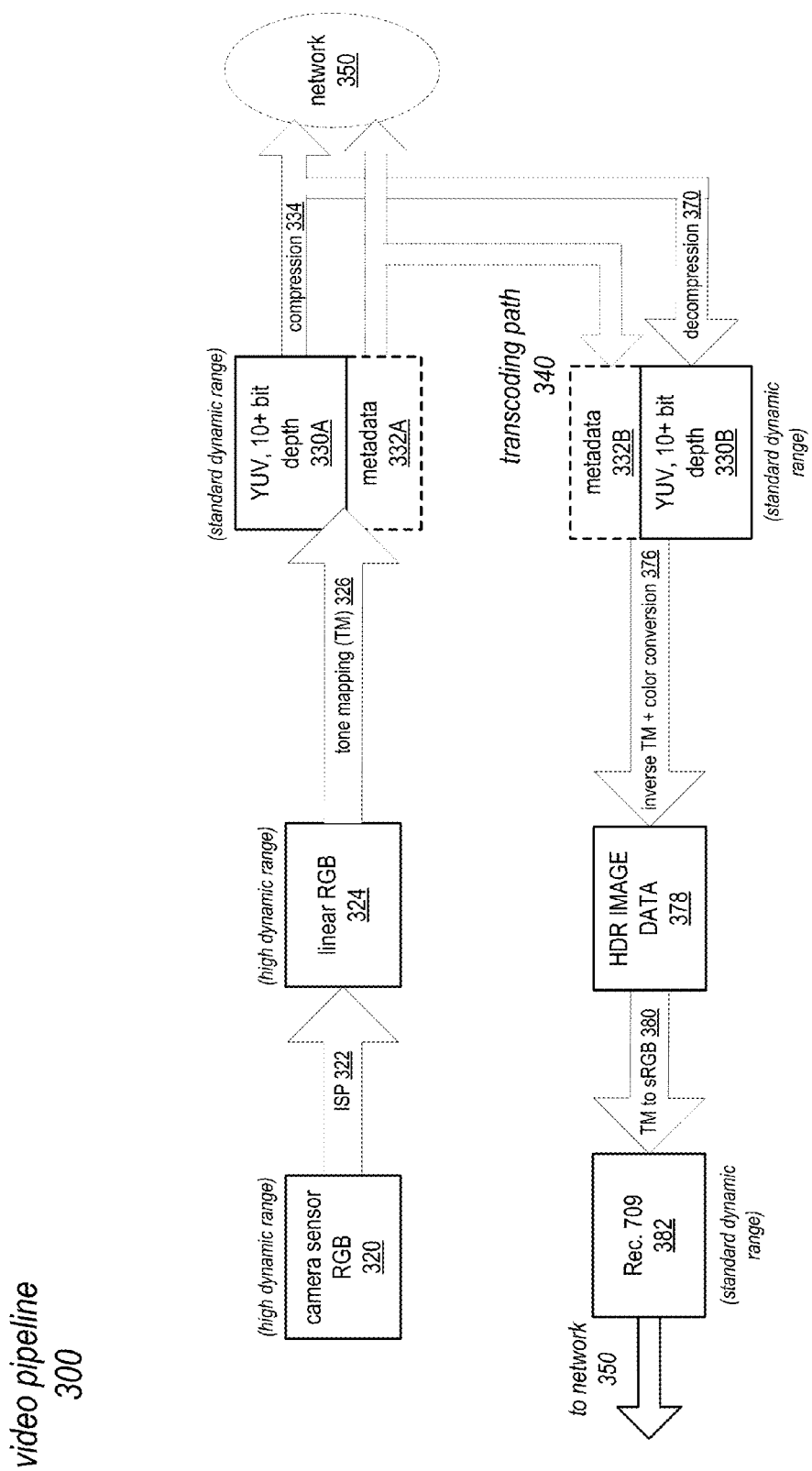
FIG. 3 illustrates an example video pipeline that provides SDR video from source HDR content, according to some embodiments.
Figure 4:
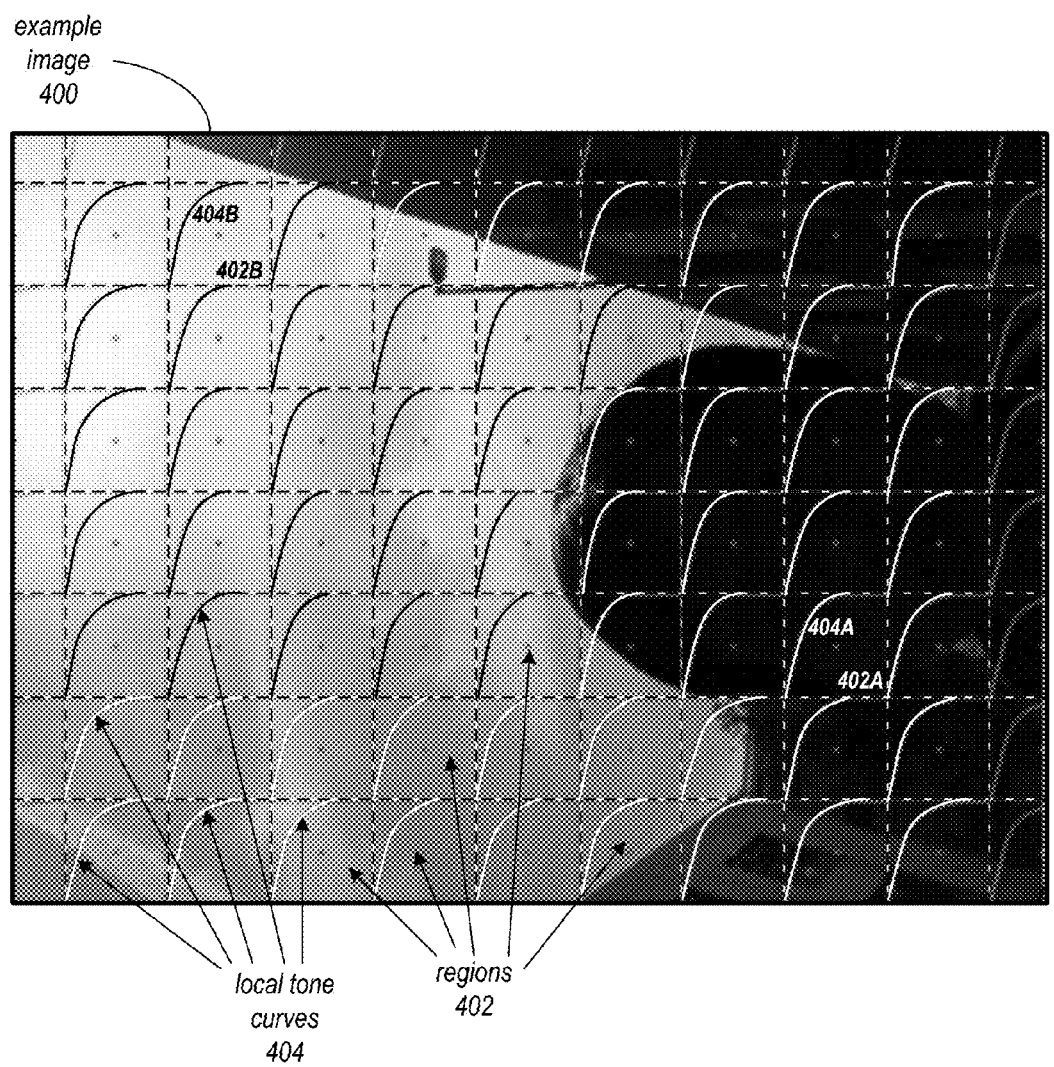
FIG. 4 illustrates local tone mapping (LTM), according to some embodiments.

FIG. 4 graphically illustrates a local tone mapping (LTM) technique, according to some embodiments. Embodiments of the LTM technique may, for example, be used in embodiments of the video pipelines as illustrated in FIGS. 1 through 3. However, embodiments of the LTM technique as described herein may be applied in other image or video processing techniques in which tone mapping is used.

As shown in FIG. 4, in a LTM technique implemented in a sensor pipeline 210 as illustrated in FIG. 2, an image 400 may be divided into multiple regions 402, with a local tone curve 404 indicated or determined for each region 402 of the image 400. While FIG. 4 shows the image 400 evenly subdivided into square or rectangular regions 402, in some embodiments regions 402 of different shapes or of varying sizes and/or shapes may be used.

The tone curves 404 for the regions 402 may be similar, but may differ at least slightly between regions 402 according to varying characteristics, for example, tone/brightness, of the regions 402. For example, in dark regions such as region 402A, the tone curve 404A may boost the dark area to provide a broader range. For bright regions such as region 402B, the tone curve 404B may not boost as much to preserve highlights.

The tone curves 404 determined for the regions 402 of an image 400 can be parameterized and stored, for example as metadata 232 as illustrated in FIG. 2, and passed or otherwise provided to a display pipeline 260 so that a wider range of tone or luminance can be recovered in an inverse LTM technique 276 to generate HDR image data 278 from the input SDR image data 230B on the display pipeline 260.

In some embodiments, additional information may be saved as metadata 232A for use in the inverse LTM technique 276 of the display pipeline 260. For example, in some embodiments, the LTM technique 226 may clip at least some image data values, and the metadata 232A may include additional information that may be used in at least partially recovering the clipped values.

In some embodiments, information used in performing color gamut mapping on the sensor pipeline 210 may also be stored as metadata 232A and provided to the display pipeline 260. The color gamut mapping information may be used in image reconstruction on the display pipeline 260 to recover a wider color gamut for display.

In various embodiments, the tone mapping metadata 232A can be compressed spatially (i.e., within an image 400 or frame) and/or temporally (e.g., across two or more images 400 or frames). For example, within an image 400, the local tone curves 402 may not change much between adjacent or nearby regions 402, and thus the tone mapping metadata 232A may be compressed within the image 400 (spatially). In addition, the tone curves may not change much between the same regions 402 in two or more adjacent images 400 or frames, and thus the tone curve information in metadata 232 may be compressed temporally (across two or more images 400 or frames).

Matching Tone Mapping to the Display

In some embodiments, the inverse tone mapping technique 276 applied by a display pipeline 260 may be tuned to match the dynamic range of a target display. The dynamic range captured by the sensor may, for example, cover a wider range than the dynamic range supported by the target display, even if the display is HDR-compatible. Thus, in some embodiments, the inverse tone mapping technique 276 of the display pipeline 260 may modify the tone mapping metadata 232B received with the SDR image data 230B according to the dynamic range of a target display, or may otherwise modify the inverse tone mapping technique 276 applied to the SDR image data 230B, to generate HDR image data 278 that matches the dynamic range of the target display.

Ambient Adaptive Tone Mapping

In some embodiments, the inverse tone mapping technique 276 of the display pipeline may be an ambient adaptive process in which information about ambient light, distance to one or more viewers, or other ambient or environmental conditions at the target display may be obtained, e.g. using one or more sensors. Based on the obtained environmental information, the inverse tone mapping technique 276 may be dynamically adjusted, for example by modifying or weighting one or more of the tone curves 404 as indicated in the metadata 232B for one or more regions 402 of the video frames being processed in the display pipeline 260. For example, if ambient light is detected to be bright at the display (e.g., above a specified threshold), the inverse tone mapping technique 276 may adjust one or more of the tone curves 404 as indicated in the metadata 232B to generate a brighter image 400 (or brighter regions 402 within an image 400) and/or an image 400 or region(s) 402 with more contrast. If ambient light is detected to be dim at the display (e.g., below a specified threshold), the inverse tone mapping technique 276 may adjust one or more of the tone curves 404 as indicated in the metadata 232B to tone down or darken the image 400 or region(s) 402 within the image 400.

Inverse Tone Mapping Methods

As previously mentioned, a display/decoding pipeline may apply an inverse tone mapping technique to recover at least part of the high dynamic range of the original video data as input to the sensor/encoding pipeline. In some embodiments, tone mapping may involve applying a transfer function (e.g., an electro-optical transfer function (EOTF)) to input video data values represented at a higher dynamic range according to a first color space (e.g., an RGB color space) to generate output video data represented at a lower dynamic range according to a second color space (e.g., a YUV color space). The transfer function may correspond to the tone curve (which may be referred to as a transfer curve), and may be represented by and stored in metadata as one or more transfer function parameter values. In some embodiments, the inverse tone mapping technique may involve applying an inverse of the transfer function as represented in the metadata to the decompressed video data obtained from the sensor/encoding pipeline.

Color Gamut Recovery

As previously mentioned, in some embodiments, in addition to recovering tone mapping information on the display side using metadata 232 as illustrated in FIG. 2, a wider color gamut as captured by a sensor may also be preserved on the sensor side 210 and at least partially recovered on the display side 260 using metadata 232. In some embodiments, the sensor pipeline 210 may generate lower color gamut image data (e.g., YUV Rec. 709 image data 230A) from wider color gamut image data (e.g., camera sensor RGB image data 220) captured by an image sensor of a camera associated with the sensor pipeline 210 using a color gamut mapping technique that may clip colors from the wider color gamut range of a color space (e.g., RGB color space) that aren't available in the lower color gamut of another color space (e.g., YUV color space). In some embodiments, in addition to tone mapping information, information used in or resulting from performing the color gamut mapping may be recorded in the metadata 232 and used by the display pipeline 260 in image reconstruction to recover a wider color gamut for displays that support WCG imaging by at least partially restoring the clipped colors.

Providing SDR Video

FIG. 3 illustrates an example video pipeline providing standard dynamic range (SDR) video from source high dynamic range (HDR) content, according to some embodiments. In FIG. 3, a video pipeline 300 may generate and output video data in different formats by encoding camera sensor RGB data 320 to generate YUV, 10+ bit depth image data 330A for output and transcoding the YUV, 10+ bit depth image data 330A to generate sRGB, Rec. 709 image data 382 for output.

As shown in FIG. 3, in a video pipeline 300, a camera sensor may capture images or frames, shown as HDR camera sensor RGB 320 data. An image signal processor (ISP) 322 may process the captured camera sensor RGB data 320 to generate HDR linear RGB image data 324 as output. A tone mapping technique 326 (e.g., a local (LTM) and/or global (GTM) tone mapping technique as described herein) may be applied to the linear RGB image data 324 to convert the HDR linear RGB image data 324 to standard dynamic range (SDR) image data in the YUV color space represented at a bit depth of 10 or more bits (YUV, 10+ bit depth image data 330A). In some embodiments, color gamut mapping may be applied to the image data to map the colors from one color space (e.g., RGB) to another (e.g., YUV). The YUV, 10+ bit depth image data 330A may be compressed 334. The video pipeline 300 may record information used to perform the tone mapping 326 and/or color gamut mapping as metadata 332A. The compressed YUV, 10+ bit depth image data 330A and metadata 332A may be output, for example via a network 350 to one or more target devices. At a target device, the YUV, 10+ bit depth image data 330A may be decompressed and processed, and the metadata 332 may be used in an inverse tone mapping technique and/or gamut mapping technique to recover at least some of the dynamic range and/or color for HDR-enabled displays.

In some embodiments, the compressed YUV, 10+ bit depth image data 330A and metadata 332A may instead or also be sent on a transcoding path 340 to be transcoded into YUV Rect. 709 image data 382 for output, for example via a network 350 to one or more target devices. On the transcoding path 340, the compressed YUV, 10+ bit depth image data 330A may be decompressed 370 to generate compressed YUV, 10+ bit depth image data 330B. The metadata 332B may be used in performing an inverse global and/or local tone mapping and color conversion operation 376 on the image data 330B to generate HDR image data 378. The inverse operation 376 may recover or reconstruct at least a portion of the luminance and/or color in image data 378 according to the metadata 332B. Another global and/or local tone mapping operation 380 may then be applied to the HDR image data 378 to generate sRGB, Rec. 709 image data 382 for output, for example via a network 350 to one or more target devices.

In some embodiments, metadata 332B may not be sent on the transcoding path 340. In some embodiments, instead of applying inverse global and/or local tone mapping and color conversion operation 376 on the decompressed image data 330B to generate HDR image data 378, and then applying another tone mapping operation 380 to convert the HDR image data 378 to Rec. 709 image data 382, the transcoding path 340 may apply a tone mapping and color conversion technique directly to the decompressed image data 330B to directly generate the Rec. 709 image data 382 from image data 330B. In some embodiments, Digital Cinema Initiatives (DCI) P3 may be used as a base layer rather than Rec. 709.

In various embodiments, the tone mapping 326 can be performed in RGB color space or in YUV color space, or in other color spaces if available.

Example Encoder/Decoder Implementation

Example embodiments of video display and playback methods and apparatus for supporting high dynamic range (HDR) and wide color gamut (WCG) video processing, recovery, and display are described. In particular, embodiments of methods and apparatus for mapping video to target display panels using encoders and decoders are described. In some embodiments, at least some of the functionality as described herein may be implemented by one or more components or modules of a system on a chip (SOC) that may be used in devices including but not limited to multi-function devices, smartphones, pad or tablet devices, and other portable computing devices such as laptop, notebook, and netbook computers. FIG. 10 illustrates an example SOC, and FIG. 11 illustrates an example device implementing an SOC.

Figure 8:
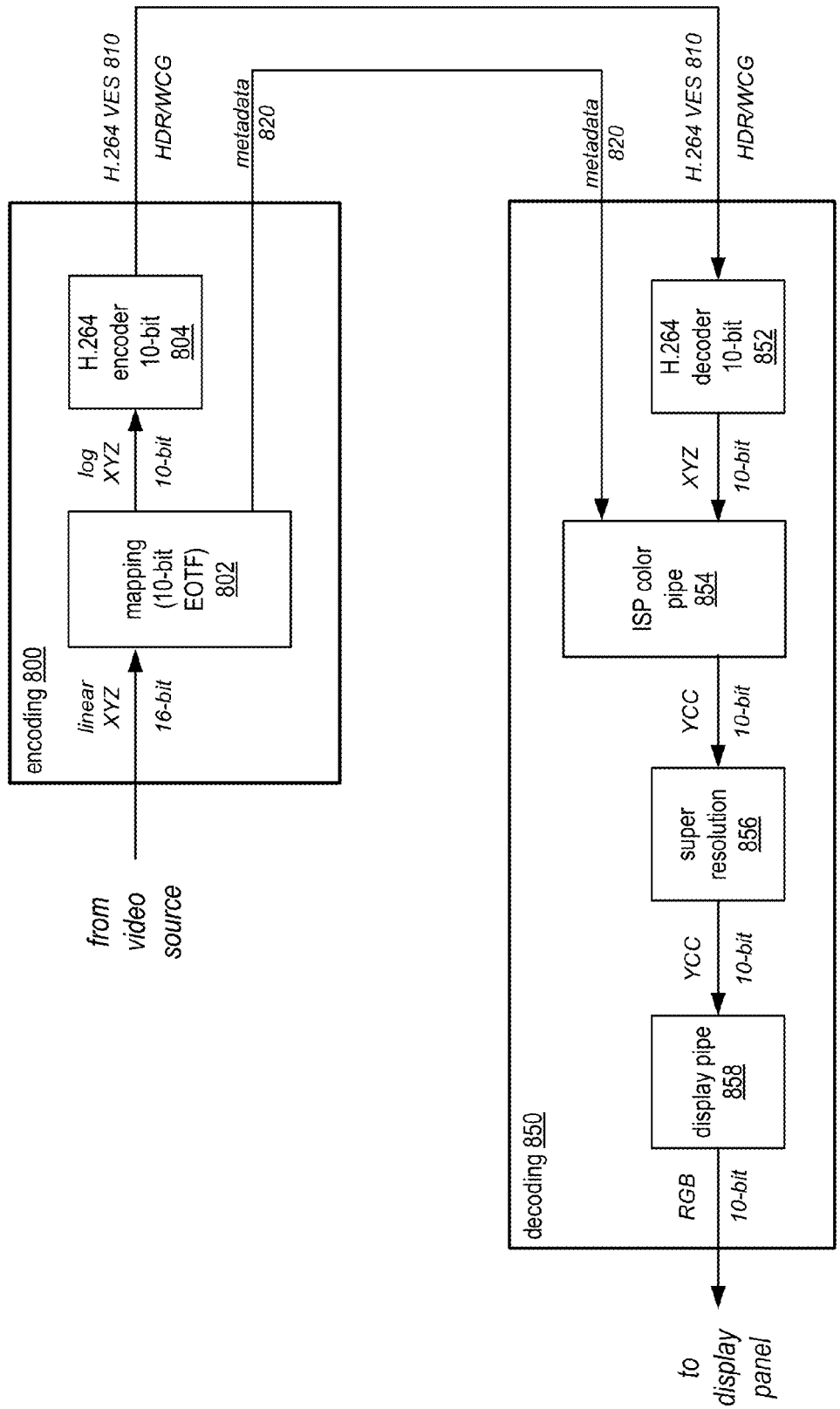
FIG. 8 illustrates an example video playback system in which an encoder generates output data in an intermediate color gamut and in which mapping to a display color gamut is performed on the decoder/display side using metadata generated by the encoder, according to some embodiments.
Figure 9:
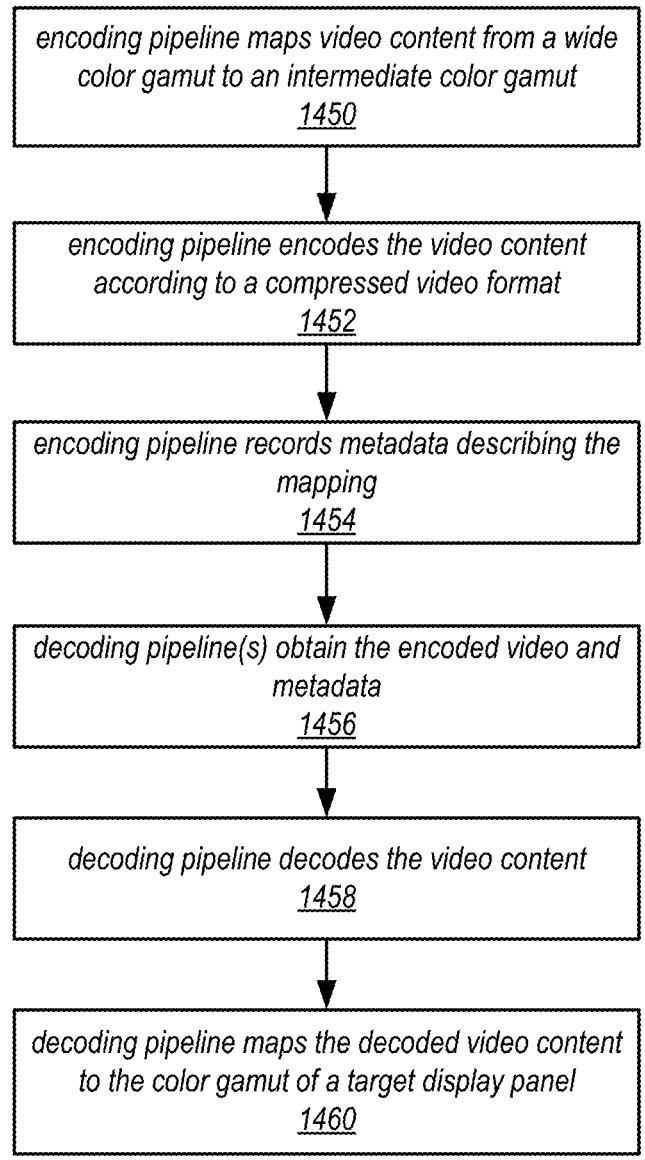
FIG. 9 is a flowchart of a video playback method in which an encoder generates output data in an intermediate color gamut and mapping to a display color gamut is performed by a decoder according to metadata generated by the encoder, according to some embodiments.

In the methods and apparatus as illustrated in FIGS. 8 and 9, mapping to a target display panel is performed at least in part on the decoder side, with gamut mapping metadata generated on the encoder side and passed to a component on the decoder side used in recovering WCG video content. In some embodiments, the methods and apparatus of FIGS. 8 and 9 may also include or implement the methods as shown in FIGS. 2 through 7 to provide both standard dynamic range (SDR) and high dynamic range (HDR) versions of video to display devices from a HDR video source.

FIG. 9 is a flowchart of a video playback method in which an encoder generates output data in an intermediate color gamut and mapping to a display color gamut is performed by a decoder according to metadata generated by the encoder, according to some embodiments. Referring to FIG. 9, as indicated at 1450, an encoding pipeline maps video content from a wide color gamut to an intermediate color gamut. This intermediate color gamut is not necessarily the full range gamut of the source content on the encoding side, but is a color gamut that may lie between the full range color gamut and the color gamut of one or more target displays. In some embodiments, the intermediate color gamut is represented at a bit depth (e.g., 10 bits) that is compatible with typical encoder/decoder hardware bit depth. As indicated at 1452 of FIG. 9, the encoding pipeline then encodes the video content according to a compressed video format, for example H.264/AVC format. Encoding the video data may involve converting the video data from one color space to another color space, for example from CIE 1931 XYZ color space to a YUV Rec. 709 color space. As indicated at 1454 of FIG. 9, the encoding pipeline records metadata describing at least the color gamut mapping that was performed.

As indicated at 1456 of FIG. 9, one or more decoding pipelines may each obtain the encoded video content and the metadata. As indicated at 1458 of FIG. 9, each decoding pipeline decodes the encoded video content to generate decoded (uncompressed) video content at the intermediate color gamut. Decoding the video data may involve converting the video data from one color space to another color space, for example from YUV to XYZ. As indicated at 1460, each decoding pipeline then maps the decoded video content from the intermediate color gamut to the color gamut of a respective target display panel according to the metadata. Mapping the video data may involve converting the video data from one color space to another color space, for example from XYZ to a YCC or YUV color space. The decoded video content may be further processed and provided to the respective display panel for display. Elements of the method of FIG. 9 are further described below in reference to FIG. 8.

FIG. 8 illustrates an example video playback system in which an encoder generates output data in an intermediate color gamut and in which mapping to a display color gamut is performed on the decoder/display side using metadata generated by the encoder, according to some embodiments. The example video playback method and system may involve H.264/AVC encoding in a wider or intermediate color gamut for distribution to displays, with decoder-side mapping to the display color gamut.

FIG. 8 shows an encoding 800 module or pipeline including one or more components and a decoding 850 module or pipeline including one or more components. In some embodiments, one or both of encoding 800 and decoding 850 may be implemented on an SOC. In some embodiments, encoding 800 and decoding 850 may be implemented on the same device and/or SOC. In some embodiments, encoding 800 and decoding 850 may be implemented on different devices or SOCs. In some embodiments, one or more encoding 800 pipelines may be implemented on a device or system; the encoding 800 pipelines may be configured to encode and stream video to one or more target devices or systems each implementing at least one decoding 850 pipeline.

In this embodiment, color gamut mapping is performed at least in part on the decoding 850 side, with a video encoded stream (VES) 810 in a wide color gamut (WCG) and gamut mapping metadata 820 generated on the encoding 800 side and passed to a component on the decoding 850 side (e.g., to an ISP color pipe 854, or alternatively to a GPU) for use in decoding 850 side gamut mapping operations. The input video content may, for example, be encoded in (linear) CIE 1931 XYZ color space at a bit depth of 16 bits. A mapping component 802 may apply a 10-bit electro-optical transfer function (EOTF) operation to the input linear XYZ video to map the 16-bit input data to 10-bit log XYZ video data. In some embodiments, the EOTF may be a transfer function that maps to a color space that is wide enough to transfer to all target display panel color spaces. Mapping component 802 may also generate metadata 820 describing the mapping operation. An H.264 encoder component 804 encodes the 10-bit log XYZ video data to generate wide color gamut (WCG) H.264 compressed video 810 at a bit depth of 10 bits.

At decoding 850, an H.264 decode component 852 decodes the H.264 compressed video 810 to generate 10-bit data in the XYZ color space. An Image Signal Processor (ISP) 854 color pipe, or alternatively a Graphics Processor Unit (GPU), may then be used to perform gamut mapping from the WCG of the 10-bit XYZ data to a display gamut according to the metadata 820. The ISP 854 may generate 10-bit data in a YCC color space. A super-resolution technique 856 may be performed on the data, and the 10-bit YCC data may then be passed to a display pipe 858 for processing into display output data, for example 10-bit RGB data, at the color gamut of the display.

In this embodiment, encoding is done in a wider color gamut that fits into a bit depth supported by encoder/decoder hardware (e.g., 10 bits), and metadata 820 is passed to the decoding 850 to be used in color gamut mapping to a display gamut. FIG. 8 shows operations in the decoding 850 side that may leverage existing components of an SOC such as an H.264 decoder, ISP color pipe, and display pipe. Decoding may be performed at a bit depth of 10 bits, and conversion to the color gamut of the display may be performed using the metadata 820 information that describes how the gamut mapping should be done that is received from the encoding 800 side.

In FIG. 8, some, but not all, of the color gamut processing is performed on the playback/decoding 850 side rather than on the server/encoding 800 side. Instead of mapping directly into the target display color gamut on the encoding 800 side, the content is mapped into an intermediate color gamut. This intermediate color gamut is not necessarily the full range gamut of the source content on the encoding 800 side, but is a color gamut that may lie between the full range color gamut and the display gamut which can fit into 10-bit and that allows existing decoding 850 hardware that can support up to 10-bit decoding to be used. At decoding 850, the metadata 820 may be used to map to the gamut of the target panel/display. In some embodiments, this mapping may be performed in two steps. As a first step, the input video content 810 is mapped back to the original wider gamut according to the metadata 820. This re-mapped content is then mapped down to the gamut of the display. In some embodiments, the playback/decoding 850 side gamut mapping may be performed on, by, or in an Image Signal Processor (ISP) color pipe 854 which may, for example, perform gamma correction, color space conversion, etc. In some embodiments, one or more components of the ISP color pipe 854 (e.g., 3D color lookup tables (CLUTS)) may be used in performing gamut mapping. However, the playback/decoding 850 gamut mapping may instead or in addition be performed by or in one or more GPUs.

Embodiments of a decoding 850 pipeline as shown in FIG. 8 may perform an initial decode with 10-bit data using a decoder 852 component, and may restore at least some of the color gamut based on metadata 820 received from encoding 800 either in an ISP color pipe 854 or in a GPU. The encoding 800 generates output encoded video stream 810 at a wider, intermediate color gamut that may attempt to capture a range of display gamut(s) that the video stream 810 could be targeted to. The metadata 820 generated by the encoding 800 and passed to one or more decoder(s) 850 defines how to map from the intermediate color gamut of the output stream 810 to the potentially narrower display gamuts. In some embodiments, the metadata 820 may reference or map into one or more lookup tables (e.g., CLUTS) that define how to map from and to different color gamuts. For example, one or more lookup tables referenced by the metadata 820 may be used by an ISP color pipe 854 or other decoding 850 component to map to a Rec. 709 gamut, to a P3 DCI D65, to a Rec. 2020 gamut, and so on. Alternatively, the metadata 820 may include equations and/or parameters (e.g., parameters for configuring a display pipe 858, ISP color pipe 854, and/or GPU(s)) for performing the decoder-side gamut mapping.

In some embodiments, metadata 820 may also include information used in a tone mapping technique (e.g., a local (LTM) and/or global (GTM) tone mapping technique) applied by the encoding 800 (e.g., by mapping 802 component) to map the input video data to a dynamic range of the output data stream 810. The metadata 820 may then be used by an inverse tone mapping technique in the decoding 850 pipeline to recover at least some dynamic range that may have been clipped in the tone mapping applied by the encoding 800. In some embodiments, a tone mapping module or component of an ISP color pipe may be used for tone mapping on the encoding 800 and/or decoding 850 side. In some embodiments, a 3D color lookup table (CLUT) of the ISP color pipe may be used for global and/or local tone mapping and for gamut mapping.

Note that the various video formats, color spaces, and so on shown in FIG. 8 are given by way of example and are not intended to be limiting. For example, other c0or spaces than CIE 1931 XYZ may be used for input video. As another example, in some embodiments, encoding and decoding may be performed according to the H.265 High Efficiency Video Coding (HEVC) format instead of the H.264/AVC format.

Example Devices and Apparatus

FIGS. 10 through 14 show non-limiting examples of devices and apparatus in or with which embodiments or components of the various digital video or image processing and display methods and apparatus as described herein may be implemented. FIG. 10 illustrates an example SOC, and FIG. 11 illustrates an example device implementing an SOC. FIG. 12 illustrates an example computer system that may implement the methods and apparatus described herein. FIGS. 13 and 14 illustrate example multifunction devices that may implement the methods and apparatus described herein.

Example System on a Chip (SOC)

Turning now to FIG. 10, a block diagram of one embodiment of a system-on-a-chip (SOC) 8000 that may be used in embodiments. SOC 8000 is shown coupled to a memory 8800. As implied by the name, the components of the SOC 8000 may be integrated onto a single semiconductor substrate as an integrated circuit "chip." In some embodiments, the components may be implemented on two or more discrete chips in a system. However, the SOC 8000 will be used as an example herein. In the illustrated embodiment, the components of the SOC 8000 include a central processing unit (CPU) complex 8020, on-chip peripheral components 8040A-8040C (more briefly, "peripherals"), a memory controller (MC) 8030, and a communication fabric 8010. The components 8020, 8030, 8040A-8040C, may all be coupled to the communication fabric 8010. The memory controller 8030 may be coupled to the memory 8800 during use, and the peripheral 8040B may be coupled to an external interface 8900 during use. In the illustrated embodiment, the CPU complex 8020 includes one or more processors (P) 8024 and a level two (L2) cache 8022.

The peripherals 8040A-8040B may be any set of additional hardware functionality included in the SOC 8000. For example, the peripherals 8040A-8040B may include video peripherals such as an image signal processor configured to process image capture data from a camera or other image sensor, display controllers configured to display video data on one or more display devices, graphics processing units (GPUs), video encoder/decoders or codecs, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 8900 external to the SOC 8000 (e.g. the peripheral 8040B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The CPU complex 8020 may include one or more CPU processors 8024 that serve as the CPU of the SOC 8000. The CPU of the system includes the processor(s) that execute the main control software of the system, such as an operating system. Generally, software executed by the CPU during use may control the other components of the system to realize the desired functionality of the system. The processors 8024 may also execute other software, such as application programs. The application programs may provide user functionality, and may rely on the operating system for lower level device control. Accordingly, the processors 8024 may also be referred to as application processors. The CPU complex 8020 may further include other hardware such as the L2 cache 8022 and/or and interface to the other components of the system (e.g. an interface to the communication fabric 8010). Generally, a processor may include any circuitry and/or microcode configured to execute instructions defined in an instruction set architecture implemented by the processor. The instructions and data operated on by the processors in response to executing the instructions may generally be stored in the memory 8800, although certain instructions may be defined for direct processor access to peripherals as well. Processors may encompass processor cores implemented on an integrated circuit with other components as a system on a chip (SOC 8000) or other levels of integration. Processors may further encompass discrete microprocessors, processor cores and/or microprocessors integrated into multichip module implementations, processors implemented as multiple integrated circuits, etc.

The memory controller 8030 may generally include the circuitry for receiving memory operations from the other components of the SOC 8000 and for accessing the memory 8800 to complete the memory operations. The memory controller 8030 may be configured to access any type of memory 8800. For example, the memory 8800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 8030 may include queues for memory operations, for ordering (and potentially reordering) the operations and presenting the operations to the memory 8800. The memory controller 8030 may further include data buffers to store write data awaiting write to memory and read data awaiting return to the source of the memory operation. In some embodiments, the memory controller 8030 may include a memory cache to store recently accessed memory data. In SOC implementations, for example, the memory cache may reduce power consumption in the SOC by avoiding re-access of data from the memory 8800 if it is expected to be accessed again soon. In some cases, the memory cache may also be referred to as a system cache, as opposed to private caches such as the L2 cache 8022 or caches in the processors 8024, which serve only certain components. Additionally, in some embodiments, a system cache need not be located within the memory controller 8030.

In an embodiment, the memory 8800 may be packaged with the SOC 8000 in a chip-on-chip or package-on-package configuration. A multichip module configuration of the SOC 8000 and the memory 8800 may be used as well. Such configurations may be relatively more secure (in terms of data observability) than transmissions to other components in the system (e.g. to the end points 16A-16B). Accordingly, protected data may reside in the memory 8800 unencrypted, whereas the protected data may be encrypted for exchange between the SOC 8000 and external endpoints.

The communication fabric 8010 may be any communication interconnect and protocol for communicating among the components of the SOC 8000. The communication fabric 8010 may be bus-based, including shared bus configurations, cross bar configurations, and hierarchical buses with bridges. The communication fabric 8010 may also be packet-based, and may be hierarchical with bridges, cross bar, point-to-point, or other interconnects.

It is noted that the number of components of the SOC 8000 (and the number of subcomponents for those shown in FIG. 10, such as within the CPU complex 8020) may vary from embodiment to embodiment. There may be more or fewer of each component/subcomponent than the number shown in FIG. 10.

FIG. 11 a block diagram of one embodiment of a system 9000 that includes at least one instance of an SOC 8000 coupled to one or more external peripherals 9020 and the external memory 8800. A power management unit (PMU) 9010 is provided which supplies the supply voltages to the SOC 8000 as well as one or more supply voltages to the memory 8800 and/or the peripherals 9020. In some embodiments, more than one instance of the SOC 8000 may be included (and more than one memory 8800 may be included as well).

The peripherals 9020 may include any desired circuitry, depending on the type of system 9000. For example, in one embodiment, the system 9000 may be a mobile device (e.g. personal digital assistant (PDA), smart phone, etc.) and the peripherals 9020 may include devices for various types of wireless communication, such as wifi, Bluetooth, cellular, global positioning system, etc. The peripherals 9020 may also include additional storage, including RAM storage, solid state storage, or disk storage. The peripherals 9020 may include user interface devices such as a display screen, including touch display screens or multitouch display screens, keyboard or other input devices, microphones, speakers, etc. In other embodiments, the system 9000 may be any type of computing system (e.g. desktop personal computer, laptop, workstation, net top etc.).

The external memory 8800 may include any type of memory. For example, the external memory 8800 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 8800 may include one or more memory modules to which the memory devices are mounted, such as single inline memory modules (SIMMs), dual inline memory modules (DIMMs), etc. Alternatively, the external memory 8800 may include one or more memory devices that are mounted on the SOC 8000 in a chip-on-chip or package-on-package implementation.

Example Computer System

FIG. 12 illustrates an example computer system 2900 that may be configured to execute any or all of the embodiments described above. In different embodiments, computer system 2900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, application server, storage device, a video recording device, a peripheral device such as a switch, modem, router, or in general any type of computing or electronic device.

Various embodiments as described herein, may be executed in one or more computer systems 2900, which may interact with various other devices. Note that any component, action, or functionality described above with respect to FIGS. 1-11 may be implemented on one or more computers configured as computer system 2900 of FIG. 12, according to various embodiments. In the illustrated embodiment, computer system 2900 includes one or more processors 2910 coupled to a system memory 2920 via an input/output (I/O) interface 2930. Computer system 2900 further includes a network interface 2940 coupled to I/O interface 2930, and one or more input/output devices or components 2950, such as cursor control 2960, keyboard 2970, display(s) 2980, camera(s) 2990, and sensor(s) 2992 including but not limited to light sensors and motion detectors. In some cases, it is contemplated that embodiments may be implemented using a single instance of computer system 2900, while in other embodiments multiple such systems, or multiple nodes making up computer system 2900, may be configured to host different portions or instances of embodiments. For example, in one embodiment some elements may be implemented via one or more nodes of computer system 2900 that are distinct from those nodes implementing other elements.

In various embodiments, computer system 2900 may be a uniprocessor system including one processor 2910, or a multiprocessor system including several processors 2910 (e.g., two, four, eight, or another suitable number). Processors 2910 may be any suitable processor capable of executing instructions. For example, in various embodiments processors 2910 may be general-purpose or embedded processors implementing any of a variety of instruction set architectures (ISAs), such as the x829, PowerPC, SPARC, or MIPS ISAs, or any other suitable ISA. In multiprocessor systems, each of processors 2910 may commonly, but not necessarily, implement the same ISA.

System memory 2920 may be configured to store program instructions 2922 and/or data accessible by processor 2910. In various embodiments, system memory 2920 may be implemented using any suitable memory technology, such as static random access memory (SRAM), synchronous dynamic RAM (SDRAM), nonvolatile/Flash-type memory, or any other type of memory. In the illustrated embodiment, program instructions 2922 may be configured to implement any of the functionality described herein. Additionally, memory 2920 may include any of the information or data structures described herein. In some embodiments, program instructions and/or data may be received, sent or stored upon different types of computer-accessible media or on similar media separate from system memory 2920 or computer system 2900. While computer system 2900 is described as implementing the functionality of functional blocks of previous Figures, any of the functionality described herein may be implemented via such a computer system.

In one embodiment, I/O interface 2930 may be configured to coordinate I/O traffic between processor 2910, system memory 2920, and any peripheral devices in the device, including network interface 2940 or other peripheral interfaces, such as input/output devices 2950. In some embodiments, I/O interface 2930 may perform any necessary protocol, timing or other data transformations to convert data signals from one component (e.g., system memory 2920) into a format suitable for use by another component (e.g., processor 2910). In some embodiments, I/O interface 2930 may include support for devices attached through various types of peripheral buses, such as a variant of the Peripheral Component Interconnect (PCI) bus standard or the Universal Serial Bus (USB) standard, for example. In some embodiments, the function of I/O interface 2930 may be split into two or more separate components, such as a north bridge and a south bridge, for example. Also, in some embodiments some or all of the functionality of I/O interface 2930, such as an interface to system memory 2920, may be incorporated directly into processor 2910.

Network interface 2940 may be configured to allow data to be exchanged between computer system 2900 and other devices attached to a network 2985 (e.g., carrier or agent devices) or between nodes of computer system 2900. Network 2985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2950 may, in some embodiments, include one or more display terminals, keyboards, keypads, touchpads, scanning devices, voice or optical recognition devices, or any other devices suitable for entering or accessing data by one or more computer systems 2900. Multiple input/output devices 2950 may be present in computer system 2900 or may be distributed on various nodes of computer system 2900. In some embodiments, similar input/output devices may be separate from computer system 2900 and may interact with one or more nodes of computer system 2900 through a wired or wireless connection, such as over network interface 2940.

As shown in FIG. 12, memory 2920 may include program instructions 2922, which may be processor-executable to implement any element or action described above. In one embodiment, the program instructions may implement the methods described above. In other embodiments, different elements and data may be included. Note that data may include any data or information described above.

Those skilled in the art will appreciate that computer system 2900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2900 may be transmitted to computer system 2900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Multifunction Device Examples

FIG. 13 illustrates a block diagram of a portable multifunction device in accordance with some embodiments. In some embodiments, the device is a portable communications device, such as a mobile telephone, that also contains other functions, such as PDA, camera, video capture and/or playback, and/or music player functions. Example embodiments of portable multifunction devices include, without limitation, the iPhone®, iPod Touch®, and iPad® devices from Apple Inc. of Cupertino, Calif. Other portable electronic devices, such as laptops, cell phones, smartphones, pad or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera and/or video camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Device 2100 may include memory 2102 (which may include one or more computer readable storage mediums), memory controller 2122, one or more processing units (CPU's) 2120, peripherals interface 2118, RF circuitry 2108, audio circuitry 2110, speaker 2111, touch-sensitive display system 2112, microphone 2113, input/output (I/O) subsystem 2106, other input control devices 2116, and external port 2124. Device 2100 may include one or more optical sensors or cameras 2164. These components may communicate over one or more communication buses or signal lines 2103.

It should be appreciated that device 2100 is only one example of a portable multifunction device, and that device 2100 may have more or fewer components than shown, may combine two or more components, or may have a different configuration or arrangement of the components. The various components shown in FIG. 13 may be implemented in hardware, software, or a combination of hardware and software, including one or more signal processing and/or application specific integrated circuits.

Memory 2102 may include high-speed random access memory and may also include non-volatile memory, such as one or more magnetic disk storage devices, flash memory devices, or other non-volatile solid-state memory devices. Access to memory 2102 by other components of device 2100, such as CPU 2120 and the peripherals interface 2118, may be controlled by memory controller 2122.

Peripherals interface 2118 can be used to couple input and output peripherals of the device to CPU 2120 and memory 2102. The one or more processors 2120 run or execute various software programs and/or sets of instructions stored in memory 2102 to perform various functions for device 2100 and to process data.

In some embodiments, peripherals interface 2118, CPU 2120, and memory controller 2122 may be implemented on a single chip, such as chip 2104. In some other embodiments, they may be implemented on separate chips.

RF (radio frequency) circuitry 2108 receives and sends RF signals, also called electromagnetic signals. RF circuitry 2108 converts electrical signals to/from electromagnetic signals and communicates with communications networks and other communications devices via the electromagnetic signals. RF circuitry 2108 may include well-known circuitry for performing these functions, including but not limited to an antenna system, an RF transceiver, one or more amplifiers, a tuner, one or more oscillators, a digital signal processor, a coder/decoder (codec) chipset, a subscriber identity module (SIM) card, memory, and so forth. RF circuitry 2108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 2110, speaker 2111, and microphone 2113 provide an audio interface between a user and device 2100. Audio circuitry 2110 receives audio data from peripherals interface 2118, converts the audio data to an electrical signal, and transmits the electrical signal to speaker 2111. Speaker 2111 converts the electrical signal to human-audible sound waves. Audio circuitry 2110 also receives electrical signals converted by microphone 2113 from sound waves. Audio circuitry 2110 converts the electrical signal to audio data and transmits the audio data to peripherals interface 2118 for processing. Audio data may be retrieved from and/or transmitted to memory 2102 and/or RF circuitry 2108 by peripherals interface 2118. In some embodiments, audio circuitry 2110 also includes a headset jack. The headset jack provides an interface between audio circuitry 2110 and removable audio input/output peripherals, such as output-only headphones or a headset with both output (e.g., a headphone for one or both ears) and input (e.g., a microphone).

I/O subsystem 2106 couples input/output peripherals on device 2100, such as touch screen 2112 and other input control devices 2116, to peripherals interface 2118. I/O subsystem 2106 may include display controller 2156 and one or more input controllers 2160 for other input control devices 2116. The one or more input controllers 2160 receive/send electrical signals from/to other input control devices 2116. The other input control devices 2116 may include physical buttons (e.g., push buttons, rocker buttons, etc.), dials, slider switches, joysticks, click wheels, and so forth. In some alternate embodiments, input controller(s) 2160 may be coupled to any (or none) of the following: a keyboard, infrared port, USB port, and a pointer device such as a mouse. The one or more buttons may include an up/down button for volume control of speaker 2111 and/or microphone 2113. The one or more buttons may include a push button.

Touch-sensitive display 2112 provides an input interface and an output interface between the device and a user. Display controller 2156 receives and/or sends electrical signals from/to touch screen 2112. Touch screen 2112 displays visual output to the user. The visual output may include graphics, text, icons, video, and any combination thereof (collectively termed "graphics"). In some embodiments, some or all of the visual output may correspond to user-interface objects.

Touch screen 2112 has a touch-sensitive surface, sensor or set of sensors that accepts input from the user based on haptic and/or tactile contact. Touch screen 2112 and display controller 2156 (along with any associated modules and/or sets of instructions in memory 2102) detect contact (and any movement or breaking of the contact) on touch screen 2112 and converts the detected contact into interaction with user-interface objects (e.g., one or more soft keys, icons, web pages or images) that are displayed on touch screen 2112. In an example embodiment, a point of contact between touch screen 2112 and the user corresponds to a finger of the user.

Touch screen 2112 may use LCD (liquid crystal display) technology, LPD (light emitting polymer display) technology, or LED (light emitting diode) technology, although other display technologies may be used in other embodiments. Touch screen 2112 and display controller 2156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 2112. In an example embodiment, projected mutual capacitance sensing technology is used, such as that found in the iPhone®, iPod Touch®, and iPad® from Apple Inc. of Cupertino, Calif.

Touch screen 2112 may have a video resolution in excess of 100 dpi. In some embodiments, the touch screen has a video resolution of approximately 160 dpi. The user may make contact with touch screen 2112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 2112, device 2100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 2112 or an extension of the touch-sensitive surface formed by the touch screen.

Device 2100 also includes power system 2162 for powering the various components. Power system 2162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 2100 may also include one or more optical sensors or cameras 2164. FIG. 13 shows an optical sensor coupled to optical sensor controller 2158 in I/O subsystem 2106. Optical sensor 2164 may, for example, include charge-coupled device (CCD) or complementary metal-oxide semiconductor (CMOS) phototransistors or photosensors. Optical sensor 2164 receives light from the environment, projected through one or more lenses, and converts the light to data representing an image. In conjunction with imaging module 2143 (also called a camera module), optical sensor 2164 may capture still images and/or video sequences. In some embodiments, at least one optical sensor may be located on the back of device 2100, opposite touch screen display 2112 on the front of the device. In some embodiments, the touch screen display may be used as a viewfinder for still and/or video image acquisition. In some embodiments, at least one optical sensor may instead or also be located on the front of the device.

Device 2100 may also include one or more proximity sensors 2166. FIG. 13 shows proximity sensor 2166 coupled to peripherals interface 2118. Alternately, proximity sensor 2166 may be coupled to input controller 2160 in I/O subsystem 2106. In some embodiments, the proximity sensor turns off and disables touch screen 2112 when the multifunction device is placed near the user's ear (e.g., when the user is making a phone call).

Device 2100 may also include one or more orientation sensors 2168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 2100. In some embodiments, the one or more orientation sensors include any combination of orientation/rotation sensors. FIG. 13 shows the one or more orientation sensors 2168 coupled to peripherals interface 2118. Alternately, the one or more orientation sensors 2168 may be coupled to an input controller 2160 in I/O subsystem 2106. In some embodiments, information is displayed on the touch screen display in a portrait view or a landscape view based on an analysis of data received from the one or more orientation sensors.

In some embodiments, device 2100 may also include one or more other sensors (not shown) including but not limited to ambient light sensors and motion detectors. These sensors may be coupled to peripherals interface 2118 or, alternately, may be coupled to an input controller 2160 in I/O subsystem 2106. For example, in some embodiments, device 2100 may include at least one forward-facing (away from the user) and at least one backward-facing (towards the user) light sensors that may be used to collect ambient lighting metrics from the environment of the device 2100 for use in video and image capture, processing, and display applications.

In some embodiments, the software components stored in memory 2102 include operating system 2126, communication module 2128, contact/motion module (or set of instructions) 2130, graphics module 2132, text input module 2134, Global Positioning System (GPS) module 2135, and applications 2136. Furthermore, in some embodiments memory 2102 stores device/global internal state 2157. Device/global internal state 2157 includes one or more of: active application state, indicating which applications, if any, are currently active; display state, indicating what applications, views or other information occupy various regions of touch screen display 2112; sensor state, including information obtained from the device's various sensors and input control devices 2116; and location information concerning the device's location and/or attitude.

Operating system 2126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 2128 facilitates communication with other devices over one or more external ports 2124 and also includes various software components for handling data received by RF circuitry 2108 and/or external port 2124. External port 2124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 2130 may detect contact with touch screen 2112 (in conjunction with display controller 2156) and other touch sensitive devices (e.g., a touchpad or physical click wheel). Contact/motion module 2130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 2130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 2130 and display controller 2156 detect contact on a touchpad.

Contact/motion module 2130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 2132 includes various software components for rendering and displaying graphics on touch screen 2112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 2132 stores data representing graphics to be used. Each graphic may be assigned a corresponding code. Graphics module 2132 receives, from applications etc., one or more codes specifying graphics to be displayed along with, if necessary, coordinate data and other graphic property data, and then generates screen image data to output to display controller 2156.

Text input module 2134, which may be a component of graphics module 2132, provides soft keyboards for entering text in various applications that need text input.

GPS module 2135 determines the location of the device and provides this information for use in various applications (e.g., to telephone module 2138 for use in location-based dialing, to camera module 2143 as picture/video metadata, and to applications that provide location-based services such as map/navigation applications).

Applications 2136 may include one or more of, but are not limited to, the following modules (or sets of instructions), or a subset or superset thereof:

telephone module 2138;
video conferencing module 2139;
camera module 2143 for still and/or video imaging;
image management module 2144;
browser module 2147;
search module 2151;

video and music player module 2152, which may be made up of a video player module and a music player module; and/or online video module 2155.

Examples of other applications 2136 that may be stored in memory 2102 include but are not limited to other word processing applications, other image editing applications, drawing applications, presentation applications, communication/social media applications, map applications, JAVA-enabled applications, encryption, digital rights management, voice recognition, and voice replication.

In conjunction with RF circuitry 2108, audio circuitry 2110, speaker 2111, microphone 2113, touch screen 2112, display controller 2156, contact module 2130, graphics module 2132, and text input module 2134, telephone module 2138 may be used to enter a sequence of characters corresponding to a telephone number, access one or more telephone numbers in an address book, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 2108, audio circuitry 2110, speaker 2111, microphone 2113, touch screen 2112, display controller 2156, optical sensor 2164, optical sensor controller 2158, contact/motion module 2130, graphics module 2132, text input module 2134, and telephone module 2138, videoconferencing module 2139 includes executable instructions to initiate, conduct, and terminate a video conference between a user and one or more other participants in accordance with user instructions.

In conjunction with touch screen 2112, display controller 2156, optical sensor(s) 2164, optical sensor controller 2158, contact/motion module 2130, graphics module 2132, and image management module 2144, camera module 2143 includes executable instructions to capture still images or video (including a video stream) and store them into memory 2102, modify characteristics of a still image or video, or delete a still image or video from memory 2102.

In conjunction with touch screen 2112, display controller 2156, contact/motion module 2130, graphics module 2132, text input module 2134, and camera module 2143, image management module 2144 includes executable instructions to arrange, modify (e.g., edit), or otherwise manipulate, label, delete, present (e.g., in a digital slide show or album), and store still and/or video images.

In conjunction with RF circuitry 2108, touch screen 2112, display system controller 2156, contact/motion module 2130, graphics module 2132, and text input module 2134, browser module 2147 includes executable instructions to browse the Internet in accordance with user instructions, including searching, linking to, receiving, and displaying web pages or portions thereof, as well as attachments and other files linked to web pages.

In conjunction with touch screen 2112, display system controller 2156, contact/motion module 2130, graphics module 2132, and text input module 2134, search module 2151 includes executable instructions to search for text, music, sound, image, video, and/or other files in memory 2102 that match one or more search criteria (e.g., one or more user-specified search terms) in accordance with user instructions.

In conjunction with touch screen 2112, display system controller 2156, contact/motion module 2130, graphics module 2132, audio circuitry 2110, speaker 2111, RF circuitry 2108, and browser module 2147, video and music player module 2152 includes executable instructions that allow the user to download and play back recorded music and other sound files stored in one or more file formats, such as MP3 or AAC files, and executable instructions to display, present or otherwise play back videos (e.g., on touch screen 2112 or on an external, connected display via external port 2124). In some embodiments, device 2100 may include the functionality of an MP3 player, such as an iPod (trademark of Apple Inc.).

In conjunction with touch screen 2112, display system controller 2156, contact/motion module 2130, graphics module 2132, audio circuitry 2110, speaker 2111, RF circuitry 2108, text input module 2134, and browser module 2147, online video module 2155 includes instructions that allow the user to access, browse, receive (e.g., by streaming and/or download), play back (e.g., on the touch screen or on an external, connected display via external port 2124), and otherwise manage online videos in one or more video formats, such as the H.264/AVC format or the H.265/HEVC format.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 2102 may store a subset of the modules and data structures identified above. Furthermore, memory 2102 may store additional modules and data structures not described above.

In some embodiments, device 2100 is a device where operation of a predefined set of functions on the device is performed exclusively through a touch screen and/or a touchpad. By using a touch screen and/or a touchpad as the primary input control device for operation of device 2100, the number of physical input control devices (such as push buttons, dials, and the like) on device 2100 may be reduced.

The predefined set of functions that may be performed exclusively through a touch screen and/or a touchpad include navigation between user interfaces. In some embodiments, the touchpad, when touched by the user, navigates device 2100 to a main, home, or root menu from any user interface that may be displayed on device 2100. In such embodiments, the touchpad may be referred to as a "menu button." In some other embodiments, the menu button may be a physical push button or other physical input control device instead of a touchpad.

FIG. 14 illustrates a portable multifunction device 2100 having a touch screen 2112 in accordance with some embodiments. The touch screen may display one or more graphics within user interface (UI) 2200. In at least some embodiments of a device 2100, a user may select one or more of the graphics by making a gesture on the graphics, for example, with one or more fingers 2202 (not drawn necessarily drawn to scale in the figure) or one or more styluses 2203 (not necessarily drawn to scale in the figure).

Device 2100 may also include one or more physical buttons, such as a "home" or menu button 2204. As described previously, menu button 2204 may be used to navigate to any application 2136 in a set of applications that may be executed on device 2100. Alternatively, in some embodiments, the menu button is may be implemented as a soft key in a GUI displayed on touch screen 2112.

In one some embodiments, device 2100 includes touch screen 2112, home or menu button 2204, push button 2206 for powering the device on/off and locking the device, volume adjustment button(s) 2208, Subscriber Identity Module (SIM) card slot 2210, head set jack 2212, and docking/charging external port 2124. Push button 2206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 2100 also may accept verbal input for activation or deactivation of some functions through microphone 2113.

Device 2100 may also include one or more cameras 2164. A camera 2164 may, for example, include charge-coupled device (CCD) or complementary metal-oxide semiconductor (CMOS) phototransistors or photosensors. A camera 2164 receives light from the environment, projected through one or more lenses, and converts the light to data representing an image or video frame. In some embodiments, at least one camera 2164 may be located on the back of device 2100, opposite touch screen display 2112 on the front of the device. In some embodiments, at least one camera 2164 may instead or also located on the front of the device with the touch screen display 2112, for example so that the user's image may be obtained for videoconferencing while the user views the other video conference participants on the touch screen display 2112. In some embodiments, at least one camera 2164 may be located on the front of the device 2100, and at least one camera 2164 may be located on the back of the device 2100. In some embodiments, the touch screen display 2112 may be used as a viewfinder and/or user interface for still image and/or video sequence acquisition applications.

Device 2100 may include video and image processing hardware and/or software, including but not limited to video encoding and/or decoding components, codecs, modules, or pipelines, that may be used to capture, process, convert, compress, decompress, store, modify, transmit, display, and otherwise manage and manipulate still images and/or video frames or video sequences captured via camera 2164 or otherwise acquired (e.g., via a network interface). In some embodiments, device 2100 may also include one or more light or other sensors that may be used to collect ambient lighting or other metrics from the environment of the device 2100 for use in video and image capture, processing, and display.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system comprising:
an encoding pipeline configured to:
    receive input video data represented at a high dynamic range in a first color space;
    apply a tone mapping technique to the input video data to convert the input video data to video data represented at a lower dynamic range in a second color space; and
    generate mapping metadata comprising tone mapping parameters used in the tone mapping technique to convert the input video data to the lower dynamic range video data; and
a decoding pipeline configured to:
    obtain the lower dynamic range video data and the mapping metadata;
    convert the lower dynamic range video data from the second color space to a third color space to generate video data represented in the third color space; and
    apply an inverse tone mapping technique to the video data represented in the third color space to generate video data represented at a higher dynamic range in the third color space, wherein the inverse tone mapping technique uses the mapping metadata to recover only part of the high dynamic range of the input video data such that the high dynamic range of the input data is wider than the higher dynamic range of the generated video data.

2. The system as recited in claim 1, wherein the encoding pipeline is further configured to:
    apply color gamut mapping to the input video data to convert the video data from the first color space to the second color space; and
    record color gamut mapping information in the mapping metadata;
wherein, to convert the lower dynamic range video data from the second color space to the third color space, the decoding pipeline is configured to recover color that was clipped by the color gamut mapping according to the color gamut mapping information in the mapping metadata.

3. The system as recited in claim 1, wherein the tone mapping technique includes a local tone mapping technique in which each image is divided into a plurality of regions, a local tone curve is dynamically determined for each region, and each region is tone mapped according to its respective local tone curve.

4. The system as recited in claim 3, wherein the mapping metadata includes information indicating the local tone curves as applied to the regions in one or more images.

5. The system as recited in claim 4, wherein the information indicating the local tone curves is compressed spatially within each image.

6. The system as recited in claim 4, wherein the information indicating the local tone curves is compressed temporally across two or more images.

7. The system as recited in claim 1, wherein the encoding pipeline is further configured to encode the lower dynamic range video data according to a compressed video format to generate compressed video data, and wherein the decoding pipeline is further configured to decode the compressed video data to obtain the lower dynamic range video data.

8. The system as recited in claim 7, wherein the compressed video format is one of H.264/Advanced Video Coding (AVC) format or H.265 High Efficiency Video Coding (HEVC) format.

9. The system as recited in claim 1, wherein the decoding pipeline is further configured to adjust the inverse tone mapping technique as applied to the video data according to dynamic range of a target display to generate the video data represented at the dynamic range of the target display.

10. The system as recited in claim 1, wherein the decoding pipeline is further configured to dynamically adjust the inverse tone mapping technique as applied to the video data according to current environmental conditions at a target display to generate the video data represented at a dynamic range adapted for viewing in the current environmental conditions of the target display.

11. The system as recited in claim 10, wherein the environmental conditions include ambient lighting conditions and distance to one or more viewers.

12. The system as recited in claim 1, wherein the first and third color spaces are RGB color spaces, and wherein the second color space is a YUV color space.

13. The system as recited in claim 1, wherein the encoding pipeline and the decoding pipeline are implemented on a single device.

14. The system as recited in claim 1, wherein the encoding pipeline and the decoding pipeline are implemented on different devices.

15. The system as recited in claim 1, wherein the encoding pipeline and the decoding pipeline are components of a system on a chip (SOC).

16. A method, comprising:
performing, by an encoding pipeline:
receiving input video data represented at a high dynamic range;
applying tone mapping to the input video data to convert the input video data to video data represented at a lower dynamic range;
generating mapping metadata comprising tone mapping parameters used in the tone mapping to map the input video data to the lower dynamic range;
encoding the lower dynamic range video data according to a compressed video format to generate compressed video data; and
providing the compressed video data and the mapping metadata to one or more display pipelines; and
performing, by a display pipeline;
decoding the compressed video data to obtain decompressed video data represented at the lower dynamic range;
applying inverse tone mapping to the decompressed video data to generate video data represented at a higher dynamic range, wherein the inverse tone mapping uses the mapping metadata to recover only part of the high dynamic range of the input video data such that the high dynamic range of the input data is wider than the higher dynamic range of the generated video data; and
displaying the video data represented at the higher dynamic range to a high dynamic range (HDR)-enabled display.

17. The method as recited in claim 16, wherein applying tone mapping to the input video data comprises:
for each video frame, dynamically determining a local tone curve for each of a plurality of regions in the frame; and
tone mapping each region according to its respective local tone curve;
wherein the mapping metadata includes information indicating the local tone curves as applied to the regions.

18. An apparatus, comprising:
an encoding module configured to:
apply tone mapping to input video data represented at a high dynamic range to generate video data represented at a lower dynamic range;
encode the lower dynamic range video data according to a compressed video format to generate compressed video data; and
output the compressed video data and mapping metadata comprising tone mapping parameters used in said tone mapping; and
a decoding module configured to:
decode the compressed video data to obtain decompressed video data represented at the lower dynamic range;
apply inverse tone mapping to the decompressed video data to generate video data represented at a higher dynamic range, wherein the inverse tone mapping technique uses the mapping metadata to recover only of the high dynamic range of the input video data such that the high dynamic range of the input data is wider than the higher dynamic range of the generated video data.

19. The apparatus as recited in claim 18, wherein the decoding module is further configured to apply tone mapping to the video data represented at a higher dynamic range to generate standard dynamic range (SDR) video data.

* * * * *